United States Patent
Chen et al.

(10) Patent No.: US 12,184,347 B2
(45) Date of Patent: Dec. 31, 2024

(54) ANGLE POSITIONING METHOD, APPARATUS, AND DEVICE

(71) Applicant: HUAWEI TECHNOLOGIES CO., LTD., Shenzhen (CN)

(72) Inventors: Lei Chen, Chengdu (CN); Yangyang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 425 days.

(21) Appl. No.: 17/733,220

(22) Filed: Apr. 29, 2022

(65) Prior Publication Data
US 2022/0263591 A1  Aug. 18, 2022

Related U.S. Application Data

(63) Continuation of application No. PCT/CN2019/114364, filed on Oct. 30, 2019.

(51) Int. Cl.
*H04B 17/318* (2015.01)
*H04L 5/00* (2006.01)
(Continued)

(52) U.S. Cl.
CPC ......... *H04B 17/318* (2015.01); *H04L 5/0048* (2013.01); *H04W 24/10* (2013.01); *H04W 64/00* (2013.01)

(58) Field of Classification Search
CPC ... H04B 17/318; H04B 7/0695; H04L 5/0048; H04L 5/0023; H04L 5/0094; H04W 24/10; H04W 64/00; G01S 1/08; G01S 5/0236
(Continued)

(56) References Cited

U.S. PATENT DOCUMENTS

| 2017/0374637 | A1  | 12/2017 | Akkarakaran et al. |
| 2018/0034611 | A1* | 2/2018  | Nagaraja ............... H04L 5/0048 |

(Continued)

FOREIGN PATENT DOCUMENTS

| CN | 107852582 A | 3/2018 |
| CN | 108064056 A | 5/2018 |

(Continued)

OTHER PUBLICATIONS

Chinese Notice of Allowance issued in corresponding Chinese Application No. 201980097452.7, dated Jul. 5, 2022, pp. 1-5.
(Continued)

*Primary Examiner* — Obaidul Huq
(74) *Attorney, Agent, or Firm* — HAUPTMAN HAM, LLP

(57) ABSTRACT

This application provides an angle positioning method, apparatus, and device. The method includes: A terminal device receives configuration information from the network device, where the configuration information includes reference signal configuration information and information about an association between N sets of frequency information and M sets of beam information. Then, the terminal device receives a reference signal corresponding to the reference signal configuration information, to obtain a measurement result, where the measurement result is obtained by measuring the reference signal based on an association relationship between frequency information and beam information. Finally, the terminal device reports the measurement result to the network device.

20 Claims, 10 Drawing Sheets

(51) Int. Cl.
*H04W 24/10* (2009.01)
*H04W 64/00* (2009.01)

(58) Field of Classification Search
USPC .................................................. 370/241, 252
See application file for complete search history.

(56) References Cited

U.S. PATENT DOCUMENTS

| | | | | |
|---|---|---|---|---|
| 2019/0081672 | A1* | 3/2019 | Hwang | .............. H04B 7/0413 |
| 2019/0116605 | A1 | 4/2019 | Luo et al. | |
| 2019/0230519 | A1 | 7/2019 | Xu et al. | |
| 2020/0068549 | A1 | 2/2020 | Kang et al. | |
| 2020/0322023 | A1* | 10/2020 | Kung | .................... H04B 7/088 |

FOREIGN PATENT DOCUMENTS

| | | |
|---|---|---|
| CN | 108702726 A | 10/2018 |
| CN | 108882360 A | 11/2018 |
| CN | 114026927 B | 9/2022 |
| WO | 2018079969 A1 | 5/2018 |
| WO | 2018171860 A1 | 9/2018 |

OTHER PUBLICATIONS

3GPP TSG RAN WG1 Meeting #90bis, R1-1718177.Work plan for Rel-15 NR WI,NTT Docomo, Inc.Prague, CZ, Oct. 9-13, 2017,total 178 pages.

Qualcomm Incorporated, Summary of 7.2.10.3: PHY procedures for positioning measurements. 3GPP TSG-RAN WG1 Meeting #96bis, Xi'an, China, Apr. 8-12, 2019, R1-1905658, 10 pages.

International Search Report issued in corresponding International Application No. PCT/2019/114364, dated Jul. 16, 2020, pp. 1-9.

Sony: "Considerations on Downlink based Positioning in NR", 3GPP Draft; R1-1902188, Feb. 16, 2019, XP051599883, total 8 pages.

Huawei: "Remaining issues on DL based positioning", 3GPP Draft; R1-1901574, Feb. 15, 2019, XP051599271, total 8 pages.

Qualcomm Incorporated:"RAT-dependent DL-only NR positioning techniques", 3GPP Draft; R1-1903018, Feb. 16, 2019, pp. 1-11, XP051600715.

Extended European Search Report issued in corresponding European Application No. 19950933.2, dated Aug. 26, 2022, pp. 1-12.

* cited by examiner

ANGLE POSITIONING METHOD, APPARATUS, AND DEVICE

CROSS-REFERENCE TO RELATED APPLICATIONS

This application is a continuation of International Application No. PCT/CN2019/114364, filed on Oct. 30, 2019, the disclosure of which is hereby incorporated by reference in its entirety

BACKGROUND

With development of communication technologies, the communication technologies are applied more widely, and the communication technologies are related to people's life. In recent years, a positioning technology has attracted more attention, to prompt research and development of the positioning technology. Angle positioning is a common positioning technology. A base station obtains an angle of a signal based on a difference between phases of the signal received on antennas, a distance between the antennas, and a signal wavelength. However, in an existing high-frequency system, combination is performed on a signal of different antennas to obtain one received signal, and an angle cannot be directly obtained based on a phase difference.

Currently, in a high-frequency multi-carrier communication system, an angle is obtained through beam scanning, so that a problem that an angle cannot be obtained based on a phase difference is resolved. For beam scanning, the base station receives a beam reporting result sent by a terminal device. For example, the beam reporting result includes a reference signal received power (RSRP) and a signal to interference plus noise ratio (SINR). Then, the base station obtains angle information based on the beam reporting result by using an algorithm of the base station. In addition, the angle is obtained based on beam powers. The terminal device sends, to the base station through beams, received signal powers corresponding to at least one beam, and the base station obtains the angle based on relative values of a plurality of received signal powers.

However, in a hybrid architecture of a high-frequency system, a direction of a beam is related to a weight of a panel and a subcarrier frequency corresponding to the beam. When a direction of a beam at a frequency is different from a direction of a subcarrier frequency, a beam squint phenomenon occurs. Consequently, when a bandwidth is large, the beam squint phenomenon causes a beam direction offset, resulting in low angle obtaining accuracy and low angle positioning accuracy.

SUMMARY

Embodiments of this application provide an angle positioning method, apparatus, and device, so that in a hybrid architecture of a high-frequency system, accuracy of a measurement result is improved, and accuracy of an angle obtained by a network device is improved. In this way, angle positioning accuracy is improved.

A first aspect of embodiments of this application provides an angle positioning method, including: In a hybrid architecture of a high-frequency system, a terminal device receives configuration information from a network device, where the configuration information includes reference signal configuration information and information about an association between N sets of frequency information and M sets of beam information, and N and M are integers greater than 1. An association relationship between frequency information and beam information is used when the terminal device measures a reference signal.

After the terminal device receives the configuration information, the terminal device receives the reference signal corresponding to the reference signal configuration information, where the reference signal is received by the terminal device based on the configuration information sent by the network device.

After the terminal device receives the reference signal, the terminal device obtains a measurement result, where the measurement result is obtained by measuring the reference signal based on the association relationship between the frequency information and the beam information.

After the terminal device obtains the measurement result, the terminal device reports the measurement result to the network device.

When the terminal device receives the configuration information sent by the network device, the terminal device receives at least two types of association relationships that are between frequency information and beam information and that are configured by the network device. Therefore, after receiving the reference signal, the terminal device obtains the measurement result by using different association relationships between the frequency information and the beam information at different frequencies, so that a beam direction offset caused by a beam squint phenomenon is reduced, accuracy of the measurement result is improved, and accuracy of an angle obtained by the network device is improved. In this way, angle positioning accuracy is improved.

With reference to the first aspect of embodiments of this application, in a first implementation of the first aspect of embodiments of this application, after the terminal device receives the reference signal, the terminal device obtains a reference signal received power, and then obtain the measurement result, where the measurement result includes angle information, and the angle information is related to the reference signal received power and the information about the association between the N sets of frequency information and the M sets of beam information. The term "related" mainly means that angle information related to different reference signal received powers and different information about an association between the N sets of frequency information and the M sets of beam information also vary accordingly.

The terminal device first obtains the received power, and then obtain the measurement result, and the angle information included in the measurement result is related to the obtained received power. This improves implementability of the solution.

With reference to either of the first aspect of embodiments of this application and the first implementation of the first aspect of embodiments of this application, in a second implementation of the first aspect of embodiments of this application, the terminal device receives, from the network device, the association information that is between the N sets of frequency information and the M sets of beam information and that is included in the configuration information, where N is equal to M. That is, the terminal device receives, from the network device, information about an association between N sets of frequency information and N sets of beam information, or information about an association between M sets of frequency information and M sets of beam information.

The terminal device obtains the information about the association between the N sets of frequency information and the N sets of beam information, or receive the information about the association between the M sets of frequency information and the M sets of beam information, where N and M are a same value and are integers greater than 1. That is, the frequency information and the beam information that are in the information about the association between the frequency information and the beam information are in one-to-one correspondence. Therefore, based on association information generated in various configuration manners, a piece of information is found so that flexibility and selectability of the solution is improved.

With reference to either of the first aspect of embodiments of this application and the first implementation of the first aspect of embodiments of this application, in a third implementation of the first aspect of embodiments of this application, the terminal device receives, from the network device, the association information that is between the N sets of frequency information and the M sets of beam information and that is included in the configuration information, where the N sets of frequency information are indicated by using an absolute radio frequency channel number (ARFCN).

With reference to any one of the first aspect of embodiments of this application, or the first to the third implementations of the first aspect of embodiments of this application, in a fourth implementation of the first aspect of embodiments of this application, the terminal device receives, from the network device, the association information that is between the N sets of frequency information and the M sets of beam information and that is included in the configuration information. The N sets of frequency information may indicate a frequency range, or the frequency information may indicate a center frequency in the frequency range.

The frequency information obtained by the terminal device is not limited to indicating the frequency range, and may alternatively indicate the center frequency in the frequency range, so that flexibility and selectability of the solution is improved. With reference to any one of the first aspect of embodiments of this application, or the first to the fourth implementations of the first aspect of embodiments of this application, in a fifth implementation of the first aspect of embodiments of this application, the terminal device receives, from the network device, the association information that is between the N sets of frequency information and the M sets of beam information and that is included in the configuration information, where the M sets of beam information include at least one of a main lobe width, a main lobe direction, a beam gain in one or more directions, a beam side lobe width, or a side lobe direction.

The beam information obtained by the terminal device is mainly radiation mode information of a beam. In addition, the beam information may further include other information. In actual application, the terminal device uses different beam information based on an actual situation, so that flexibility, selectability, and implementability of the solution is improved. With reference to any one of the first aspect of embodiments of this application, or the first to the fifth implementations of the first aspect of embodiments of this application, in a sixth implementation of the first aspect of embodiments of this application, after the terminal device obtains the measurement result, the measurement result reported by the terminal device to the network device may further include measurement frequency information or a beam information index.

The measurement frequency information or the beam information index is added to the measurement result reported by the terminal device to the network device, so that the network device more accurately finds frequency-related information corresponding to the measurement result. In this way, angle positioning efficiency of the network device is improved.

A second aspect of embodiments of this application provides an angle positioning method, including:

A terminal device receives configuration information from a network device, where the configuration information includes reference signal configuration information and correction information, and the correction information is information that is used when the terminal device corrects an initial measurement result.

After the terminal device receives the configuration information, the terminal device receives a reference signal corresponding to the reference signal configuration information, where the reference signal is received by the terminal device based on the configuration information sent by the network device.

After the terminal device receives the reference signal, the terminal device obtains a measurement result, where the measurement result is obtained by correcting the initial measurement result based on the correction information.

After the terminal device obtains the measurement result, the terminal device reports the measurement result to the network device.

The terminal device receives the correction information configured by the network device, and corrects the initial measurement result based on the correction information, in other words, corrects a beam direction offset caused by a beam squint phenomenon, obtains the measurement result, and reports the measurement result to the network device, to reduce the beam direction offset caused by the beam squint phenomenon, improve accuracy of the measurement result, and improve accuracy of an angle obtained by the network device. In this way, accuracy of angle positioning is improved.

With reference to the second aspect of embodiments of this application, in a first implementation of the second aspect of embodiments of this application, the configuration information received by the terminal device from the network device further includes an association relationship between reference frequency information and beam information, where the association relationship between the reference frequency information and the beam information is used by the terminal device to measure the reference signal to obtain the initial measurement result.

With reference to the second aspect of embodiments of this application, in a second implementation of the second aspect of embodiments of this application, after the terminal device receives the reference signal, the terminal device obtains a reference signal received power. The received power is obtained by measuring the reference signal based on the association relationship between the reference frequency information and the beam information. Then, the terminal device obtains the initial measurement result based on the received power. Finally, the terminal device obtains the measurement result based on the initial measurement result and the correction information.

The terminal device measures the reference signal based on the association relationship between the reference frequency information and the beam information, to obtain the reference signal received power, obtains the initial measurement result based on the received signal, and then obtains the measurement result. A manner of obtaining the initial measurement result is refined, so that implementability of the solution is improved.

With reference to any one of the second aspect of embodiments of this application, or the first or the second implementation of the second aspect of embodiments of this application, in a third implementation of the second aspect of embodiments of this application, the terminal device receives, from the network device, association information that is between N sets of frequency information and M sets of beam information and that is included in the configuration information, where the N sets of frequency information are indicated by using an absolute radio frequency channel number (ARFCN).

With reference to any one of the second aspect of embodiments of this application, or the first or the second implementation of the second aspect of embodiments of this application, in a fourth implementation of the second aspect of embodiments of this application, the frequency information obtained by the terminal device may indicate a frequency range, or the frequency information may indicate a center frequency in the frequency range.

The frequency information obtained by the terminal device is not limited to indicating the frequency range, and may alternatively indicate the center frequency in the frequency range, so that flexibility and selectability of the solution is improved.

With reference to any one of the second aspect of embodiments of this application, or the first to the fourth implementations of the second aspect of embodiments of this application, in a fifth implementation of the second aspect of embodiments of this application, the beam information obtained by the terminal device includes at least one of a main lobe width, a main lobe direction, a beam gain in one or more directions, a beam side lobe width, or a side lobe direction.

The beam information obtained by the terminal device is mainly radiation mode information of a beam. In addition, the beam information may further include other information. In actual application, the terminal device uses different beam information based on an actual situation, so that flexibility, selectability, and implementability of the solution is improved.

With reference to any one of the second aspect of embodiments of this application, or the first to the fifth implementations of the second aspect of embodiments of this application, in a sixth implementation of the second aspect of embodiments of this application, the correction information obtained by the terminal device includes at least one of beam correction information, angle correction information, or power correction information. With reference to the sixth implementation of the second aspect of embodiments of this application, in a seventh implementation of the second aspect of embodiments of this application, the angle correction information obtained by the terminal device includes at least one of angle offset compensation information or an angle mapping table.

With reference to any one of the second aspect of embodiments of this application, or the first to the seventh implementations of the second aspect of embodiments of this application, in an eighth implementation of the second aspect of embodiments of this application, after the terminal device obtains the measurement result, the measurement result reported by the terminal device to the network device may further include measurement frequency information or a beam information index.

The measurement frequency information or the beam information index is added to the measurement result reported by the terminal device to the network device, so that the network device more accurately finds frequency-related information corresponding to the measurement result. In this way, angle positioning efficiency of the network device is improved.

According to a third aspect, a terminal device is provided. The terminal device includes modules configured to perform the method in any one of the first aspect or the possible implementations of the first aspect.

According to a fourth aspect, a terminal device is provided. The terminal device includes modules configured to perform the method in any one of the second aspect or the possible implementations of the second aspect.

According to a fifth aspect, an angle positioning apparatus is provided. The angle positioning apparatus is the terminal device in the foregoing method designs, or is a chip disposed in the terminal device. The angle positioning apparatus includes a processor, coupled to a memory, and is configured to execute instructions in the memory, to implement the method performed by the terminal device in any one of the first aspect and the possible implementations of the first aspect. Optionally, the angle positioning apparatus further includes the memory. Optionally, the angle positioning apparatus further includes a communication interface, and the processor is coupled to the communication interface.

When the angle positioning apparatus is the terminal device, the communication interface is a transceiver or an input/output interface.

When the angle positioning apparatus is the chip disposed in the terminal device, the communication interface is an input/output interface.

Optionally, the transceiver is a transceiver circuit. Optionally, the input/output interface is an input/output circuit.

According to a sixth aspect, an angle positioning device is provided. The angle positioning device is the terminal device in the foregoing method designs, or is a chip disposed in the terminal device. The angle positioning device includes a processor, coupled to a memory, and is configured to execute instructions in the memory, to implement the method performed by the terminal device in any one of the second aspect and the possible implementations of the second aspect. Optionally, the angle positioning device further includes the memory. Optionally, the angle positioning device further includes a communication interface, and the processor is coupled to the communication interface.

When the angle positioning device is the terminal device, the communication interface is a transceiver or an input/output interface.

When the angle positioning device is the chip disposed in the terminal device, the communication interface is an input/output interface.

Optionally, the transceiver is a transceiver circuit. Optionally, the input/output interface is an input/output circuit.

According to a seventh aspect, a program is provided. When being executed by a processor, the program is configured to perform any method in the first aspect or the second aspect or the possible implementations of the first aspect or the second aspect.

According to an eighth aspect, a program product is provided. The program product includes program code. When the program code is run by a communication unit and a processing unit, or a transceiver and a processor of an angle positioning device, the angle positioning device is enabled to perform the method in any one of the first aspect and the possible implementations of the first aspect.

According to a ninth aspect, a program product is provided. The program product includes program code. When the program code is run by a communication unit and a processing unit, or a transceiver and a processor of an angle positioning device, the angle positioning device is enabled to perform the method in any one of the second aspect and the possible implementations of the second aspect.

According to a tenth aspect, a chip system is provided, and used in a terminal device. The chip system includes at least one processor and a communication interface, the chip system may further include a memory, the memory and the communication interface are interconnected to the at least one processor through a line, and the at least one memory stores instructions. The instructions are executed by the processor to perform an operation of the terminal device in any method according to the first aspect and the possible implementations of the first aspect.

According to an eleventh aspect, a chip system is provided, and used in a terminal device. The chip system includes at least one processor and a communication interface, the chip system may further include a memory, the memory and the communication interface are interconnected to the at least one processor through a line, and the at least one memory stores instructions. The instructions are executed by the processor to perform an operation of the terminal device in any method according to the second aspect and the possible implementations of the second aspect.

According to a twelfth aspect, a computer-readable storage medium is provided. The computer-readable storage medium stores a program, and the program enables an angle positioning device to perform the method according to any one of the first aspect and the possible implementations of the first aspect.

According to a thirteenth aspect, a computer-readable storage medium is provided. The computer-readable storage medium stores a program, and the program enables an angle positioning device to perform the method according to any one of the second aspect and the possible implementations of the second aspect.

In the technical solutions provided in embodiments of this application, in the hybrid architecture of the high-frequency system, the terminal device receives at least two types of association relationships that are between frequency information and beam information and that are configured by the network device, and obtains the measurement result at different frequencies by using different association relationships between the frequency information and the beam information. In addition, the terminal device may further receive the correction information configured by the network device, correct the initial measurement result based on the correction information, in other words, correct the beam direction offset caused by the beam squint phenomenon, obtain the measurement result, and report the measurement result to the network device, to reduce the beam direction offset caused by the beam squint phenomenon, improve the accuracy of the measurement result, and improve the accuracy of the angle obtained by the network device. In this way, the accuracy of angle positioning is improved.

DESCRIPTION OF EMBODIMENTS

The following clearly describes the technical solutions in embodiments of this application with reference to the accompanying drawings in embodiments of this application. The described embodiments are some of embodiments of this application.

In this disclosure, the claims, and the accompanying drawings of this application, terms "first", "second", "third", "fourth", and the like (if existent) are intended to distinguish between similar objects but do not necessarily indicate an order or sequence. The data termed in such a way are interchangeable in an appropriate circumstance, so that embodiments described herein are implemented in another order other than the order illustrated or described herein. In addition, the terms "include", "contain" and any other variants mean to cover the non-exclusive inclusion. For example, a process, method, system, product, or device that includes a list of operations or units is not necessarily limited to those operations or units, but may include other operations of units not expressly listed or inherent to such a process, method, product, or device.

Figure 1:
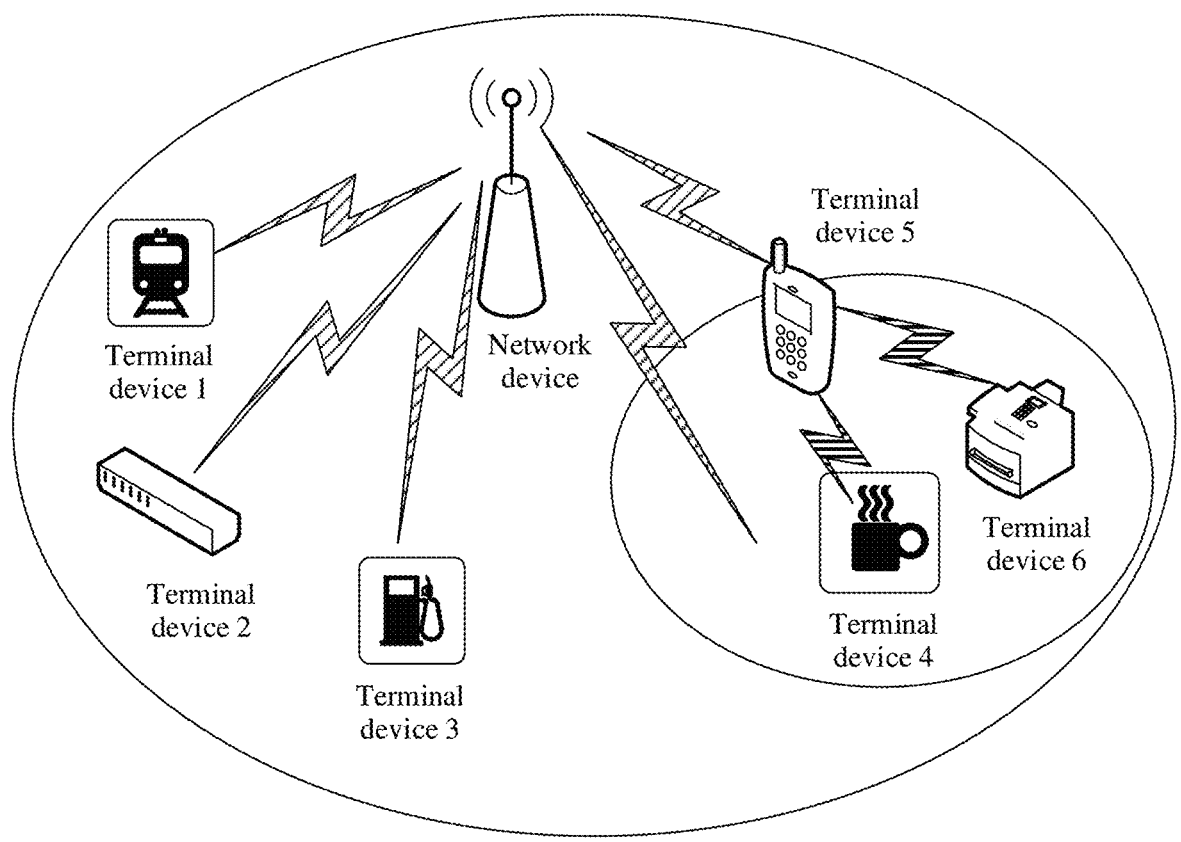
FIG. 1 is a schematic diagram of a system architecture of a multi-carrier communication system according to an embodiment.

To better understand an angle positioning method, apparatus, and device disclosed in embodiments of this application, the following first describes a system architecture used in embodiments of the present disclosure. FIG. 1 is a schematic diagram of a system architecture of a multi-carrier communication system according to an embodiment of this application.

Embodiments of this application is applied to a long term evolution (LTE) system, a 5th generation (5G) mobile communication system, or a next-generation communication system, such as a 6G, a device to device (D2D) communication system, an Internet of Things communication system, and an Internet of Vehicles communication system, of a terminal device. The following uses a system architecture of a multi-carrier communication system as an example for description. As shown in FIG. 1, in this system architecture, a network device and a terminal device form a communication system. The terminal device includes a terminal device 1 to a terminal device 6. In the multi-carrier communication system, the terminal device 1 to the terminal device 6 may send uplink data to the network device, and the network device receives the uplink data sent by the terminal device 1 to the terminal device 6. In addition, the terminal device 4 to the terminal device 6 may form a communication system. In the communication system, the network device may send downlink data to the terminal device 1, the terminal device 2, the terminal device 3, and the terminal device 5, and the terminal device 5 may also send downlink information to the terminal device 4 and the terminal device 6. The multi-carrier communication system includes uplink (from the terminal device to the network device) communication and downlink (from the access network device to the terminal device) communication in the communication system. At a physical layer, the uplink communication includes transmission of an uplink physical channel and an uplink signal. The uplink physical channel includes but is not limited to a random access channel (RACH), a physical uplink control channel (PUCCH), and a physical uplink data channel (PUSCH). The uplink signal includes but is not limited to a sounding reference signal (SRS), an uplink control channel demodulation reference signal (PUCCH-DMRS), an uplink data channel demodulation reference signal, an uplink phase noise tracking reference signal (PTRS), and an uplink positioning signal. The downlink communication includes transmission of a downlink physical channel and a downlink signal. The downlink physical channel includes but is not limited to a physical broadcast channel (PBCH), a physical downlink control channel (PDCCH), and a physical downlink data channel (PDSCH). The downlink signal includes but is not limited to a primary synchronization signal (PSS), a secondary synchronization signal (SSS), a downlink control channel demodulation reference signal, a downlink data channel demodulation reference signal, a phase noise tracking signal, a channel state information reference signal (CSI-RS), and a positioning reference signal (Positioning RS).

Figure 2:
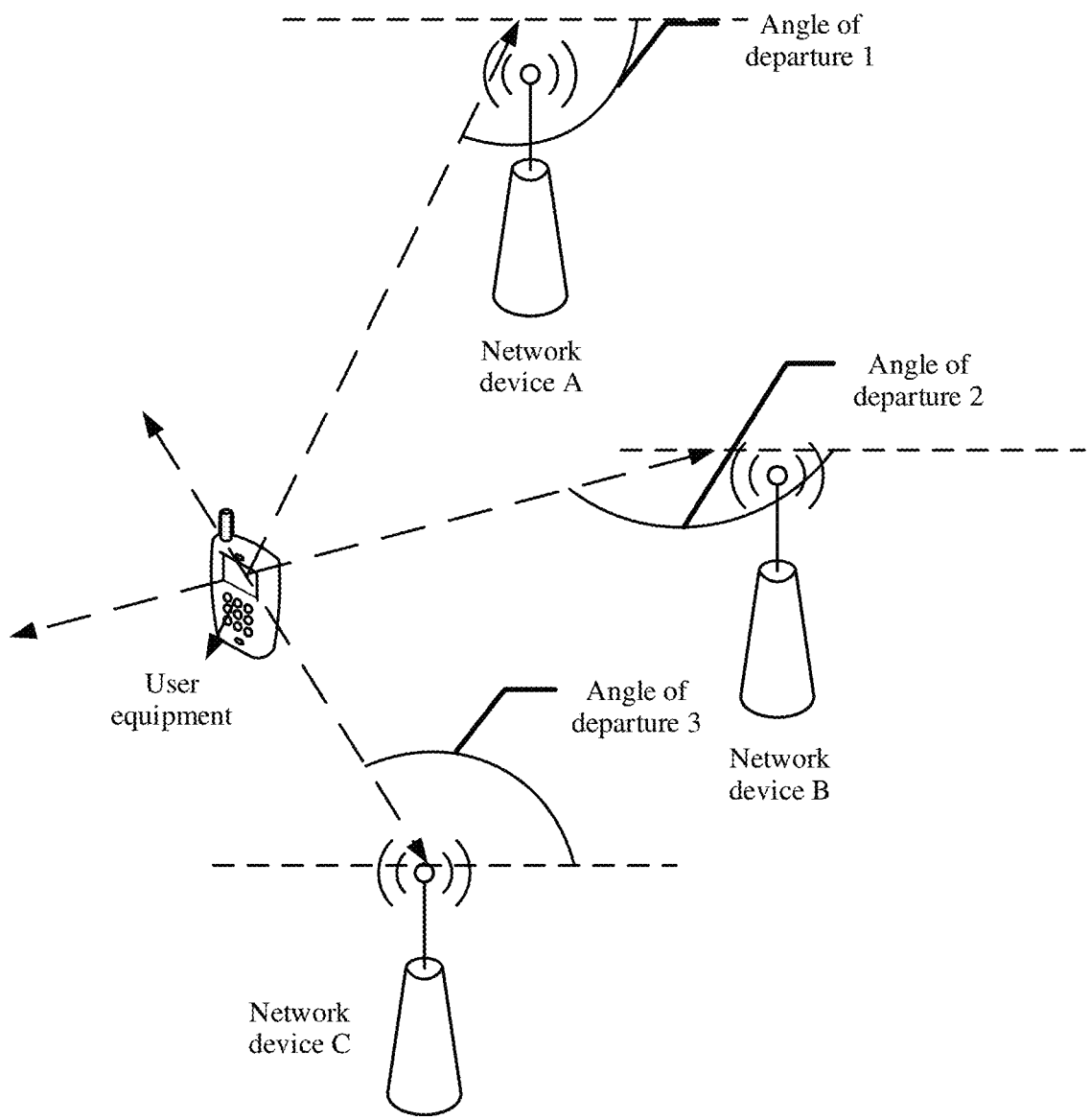
FIG. 2 is a schematic diagram of angle positioning according to an embodiment.

A schematic diagram of an angle positioning technology currently applied to a multi-carrier communication system is shown in FIG. 2. A network device measures a received signal (on an uplink), performs measurement feedback on a sent signal (on a downlink), and then obtains a location angle relationship between the network device and a terminal device. Generally, the location angle relationship is an angle of departure. As shown in FIG. 2, a network device A, a network device B, and a network device C obtains an angle of departure 1, an angle of departure 2, and an angle of departure 3 for a same terminal device, to position the terminal device by using a plurality of groups of angles of departure. In at least one embodiment, the angle positioning technology is further combined with a technology in which positioning is implemented based on a delay or a field strength. A method for obtaining a user location based on the delay or the field strength is not limited in this disclosure.

Figure 3:
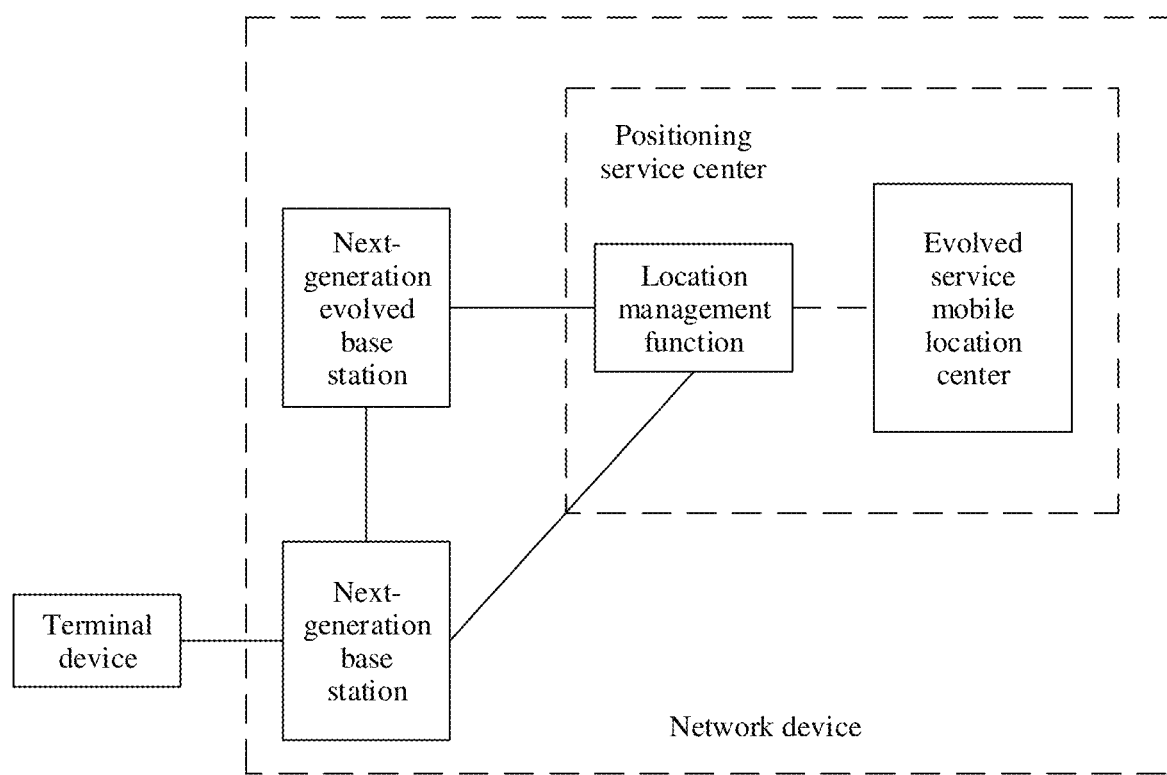
FIG. 3 is a schematic diagram of a system architecture of an angle positioning system according to an embodiment.

Further, to better understand the angle positioning method disclosed in embodiments herein, the following describes an angle positioning system architecture used. FIG. 3 is a schematic diagram of a system architecture of an angle positioning system according to an embodiment.

The angle positioning system shown in FIG. 3 includes at least one network device and one or more terminal devices served by the network device. The network device includes but is not limited to a base station, a positioning service center, and a transmission point, and the terminal device in embodiments of the present disclosure is mainly a terminal device that is positioned.

As shown in FIG. 3, data exchange between the terminal device and the positioning service center is implemented by using the LTE Positioning Protocol (LPP) or the NR Positioning Protocol (NRPP), and data exchange between the base station and the positioning service center is implemented by using the LTE Positioning Protocol a (LPPa) or the NR Positioning Protocol a (NRPPa).

When the network device is the positioning service center, the positioning service center further includes at least one of a location management function or an evolved service mobile location center. The network device is mainly configured to collect a browser/server (B/S) structure and measurement information and location information of the terminal device, and is responsible for performing location resolving on a measurement result reported by the terminal device, to determine a location of the terminal device.

When the network device is the base station, the network device is an evolved NodeB (eNB), a next-generation base station (gNB), a next-generation e-NB (ng-eNB), a transmission and reception point TRP, or another device. When the network device is the eNB or the gNB, the network device is a serving cell base station or a neighboring cell base station.

The eNB is a bridge between a terminal device and an evolved packet core (EPC) in LTE (4G), and eNBs are connected to each other through an X2 interface. Main functions of the eNB include radio resource management, IP header compression, user data stream encryption, MME selection during terminal device attachment, routing of user plane data to an S-GW, organization and sending of a paging message, organization and sending of a broadcast message, measurement for mobility or scheduling purposes, measurement report configuration, and the like.

The gNB is a base station that provides new radio (NR) user plane and control plane protocols for a terminal device, and is connected to a 5G core network (5GC) through an NG interface.

The ng-eNB is a base station that provides E-UTRA user plane and control plane protocols for a terminal device, and is connected to a 5GC through an NG interface.

The terminal device 1 to the terminal device 6 are devices that provide voice or data connectivity for a user, or chips disposed in the devices, for example, handheld devices or vehicle-mounted devices with a wireless connection function. Currently, for example, the terminal device is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in a remote medical surgery, a wireless terminal in a smart grid, a wireless terminal in transportation safety, a wireless terminal in a smart city, a wireless terminal in a smart home, and the like.

Figure 4:
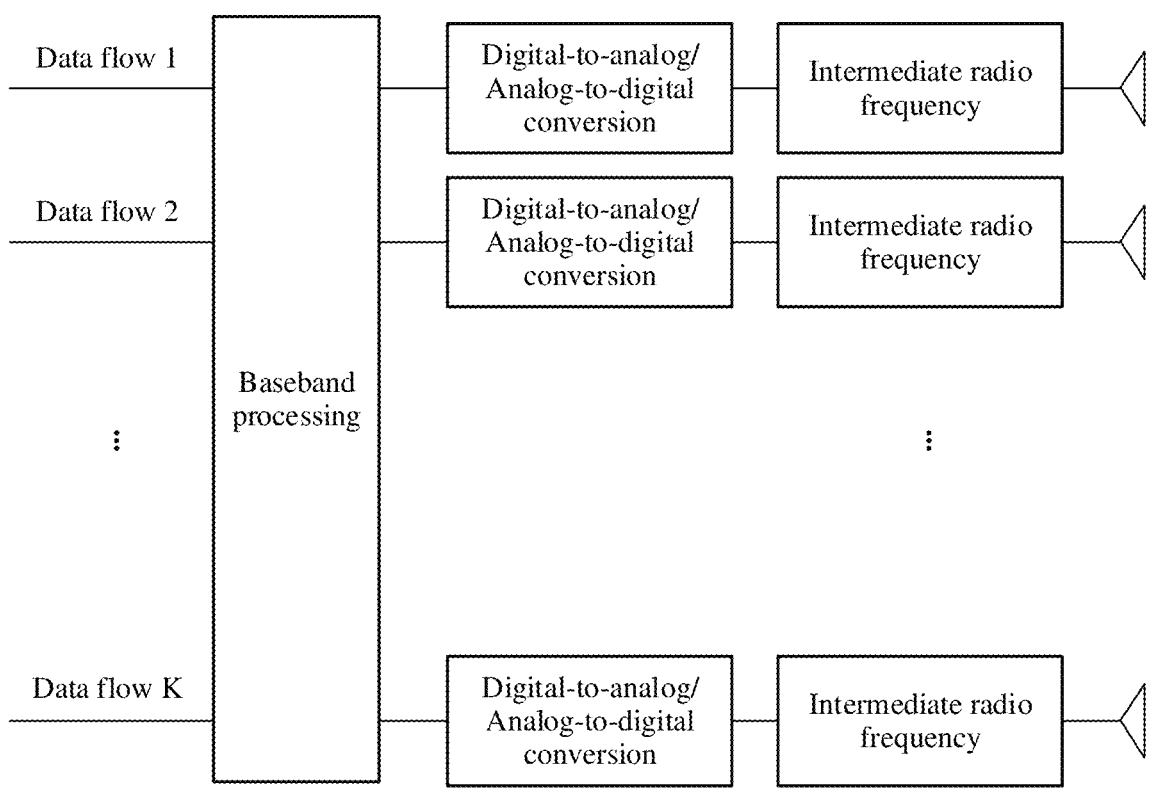
FIG. 4 is a schematic diagram of an architecture of a transceiver based on an all-digital architecture of a low-frequency system according to an embodiment.

FIG. 4 shows an all-digital architecture transceiver in a low-frequency system. In a multi-antenna system in a low frequency band, a signal received by a receive antenna is converted into a digital signal by using an analog-to-digital converter, and then baseband signal processing is performed. As shown in FIG. 4, because a signal received by an antenna is converted, through analog-to-digital conversion, for storage in digital domain, for a baseband, complete signal information on an antenna is obtained.

Figure 5:
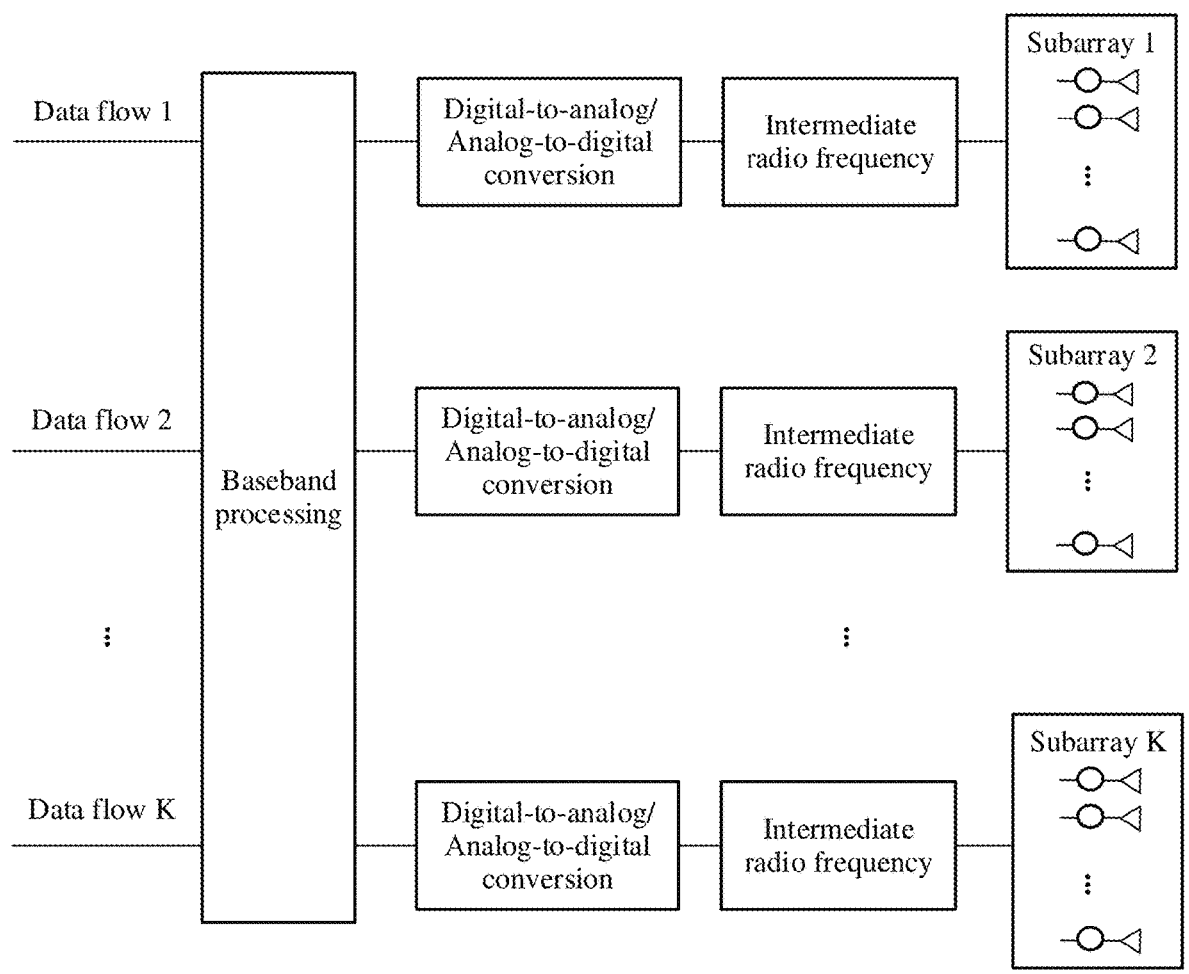
FIG. 5 is a schematic diagram of an architecture of a transceiver based on a hybrid architecture of a high-frequency system according to an embodiment.

Further, FIG. 5 is a schematic diagram of an architecture of a transceiver based on a hybrid architecture of a high-frequency system according to an embodiment. In the high-frequency system, to resist a path loss, the high-frequency system uses more antennas to provide a higher antenna gain. Therefore, the high-frequency system usually has a large quantity of antennas, and generally, there are dozens or even hundreds of antennas. If a signal of a transceiver antenna is converted in digital domain for separate processing, a large quantity of analog-to-digital/digital-to-analog conversion devices are used. Therefore, to control costs and power consumption, in a high-frequency system architecture, combination is usually performed on a received signal of a plurality of antennas in analog domain, and then a combined signal is converted in digital domain. In this way, costs are reduced to some extent. Compared with the low-frequency all-digital architecture, in this architecture, preprocessing is performed in analog domain, and this architecture is referred to as a hybrid architecture. As shown in FIG. 5, in analog domain of the hybrid architecture, one weight value is used to receive a signal at a moment. Once a weight value for combination in analog domain is fixed, a combined signal in analog domain is further fixed, and then various types of digital signal processing is performed after the signal is converted from the analog domain to the digital domain, but processing in analog domain is fixed and cannot be modified. One type of analog domain processing is adjusting a power gain direction of an array by using an analog weight value on the array, that is, performing receiving by using an analog beam. At a same moment, one analog panel, namely, a subarray shown in FIG. 5, has one weight value, namely, one determined beam direction. Compared with an output of the low-frequency digital architecture, an output of a panel in a high-frequency system is obtained through weighted combination in analog domain, and the combination is irreversible. Therefore, in the hybrid architecture, a baseband signal is a result obtained by performing irreversible analog filtering on received signals of antennas on a per-subarray basis. Consequently, a signal on an antenna element is no longer recovered.

Figure 6:
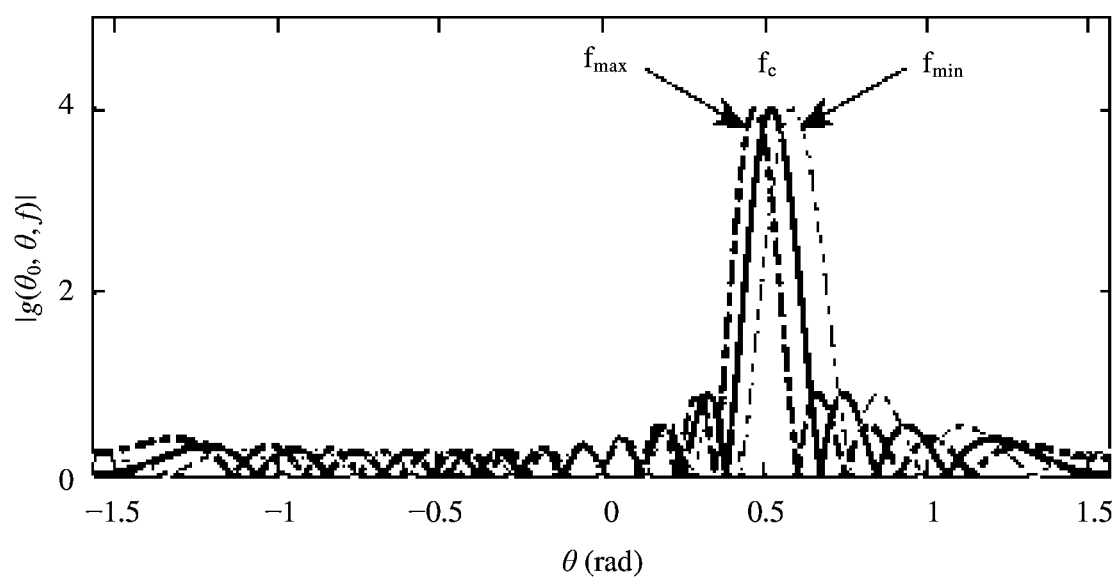
FIG. 6 is a schematic diagram of a beam direction based on a high-frequency system according to an embodiment.

FIG. 6 is a schematic diagram of a beam direction based on a high-frequency system according to an embodiment. In a transceiver in a hybrid architecture of the high-frequency system, a beam direction is related to a weight value of an antenna element and a frequency of a corresponding sub-carrier. If impact of an actual frequency on a beam direction is not considered, an actual beam direction at a frequency is different from a beam direction at a carrier frequency. This is a beam squint phenomenon. This phenomenon causes deterioration of angle of departure (AOD) estimation performance. As shown in FIG. 6, $f_c$ represents the beam direction at the carrier frequency, $f_{max}$ represents a beam direction at a maximum frequency in the system, and $f_{min}$ represents a beam direction at a minimum frequency in the system. FIG. 6 shows that the three beam directions are different. In addition, larger $f_c$ indicates a larger bandwidth and larger offsets of $f_{max}$ and $f_{min}$ relative to a beam direction at a center frequency. According to the schematic diagram of angle positioning shown in FIG. 2, in a high-frequency system, because AOD estimation performance deteriorates, accuracy of angle positioning of a terminal device is low.

For ease of understanding, some terms or concepts in embodiments are explained herein.

A beam is a communication resource. The beam is a wide beam, a narrow beam, or another type of beam. A beamforming technology is a digital beamforming technology, an analog beamforming technology, or a hybrid digital/analog beamforming technology. Different beams are considered as different resources, and same information or different information is sent by using different beams. Optionally, a plurality of beams that have a same or similar communication feature are considered as one beam, and one beam may include one or more antenna ports used to transmit a data channel, a control channel, a sounding signal, and the like. For example, a transmit beam refers to distribution of signal strength formed in different directions in space after a signal is transmitted through an antenna, and a receive beam refers to distribution of signal strength that is of a radio signal received from an antenna and that is in different directions in space. One or more antenna ports forming one beam may also be considered as one antenna port set, and the beam is a spatial filter in a protocol.

Antenna panel: A wireless communication signal is received and sent by an antenna. A plurality of antenna elements is integrated into one panel, or one radio frequency link may drive one or more antenna elements. In embodiments, a terminal device includes a plurality of antenna panels, and an antenna panel includes one or more beams. A network device includes a plurality of antenna panels, and an antenna panel includes one or more beams. The antenna panel is alternatively represented as an antenna array or an antenna subarray. One antenna panel includes one or more antenna arrays/subarrays. One antenna panel is controlled by one or more oscillators. The radio frequency link is referred to as a receive channel, a transmit channel, and a receiver branch. One antenna panel is driven by one radio frequency link, or is driven by a plurality of radio frequency links. Therefore, the antenna panel in this embodiment is replaced with a radio frequency link, a plurality of radio frequency links that drive one antenna panel, or one or more radio frequency links controlled by one crystal oscillator.

Figure 7:
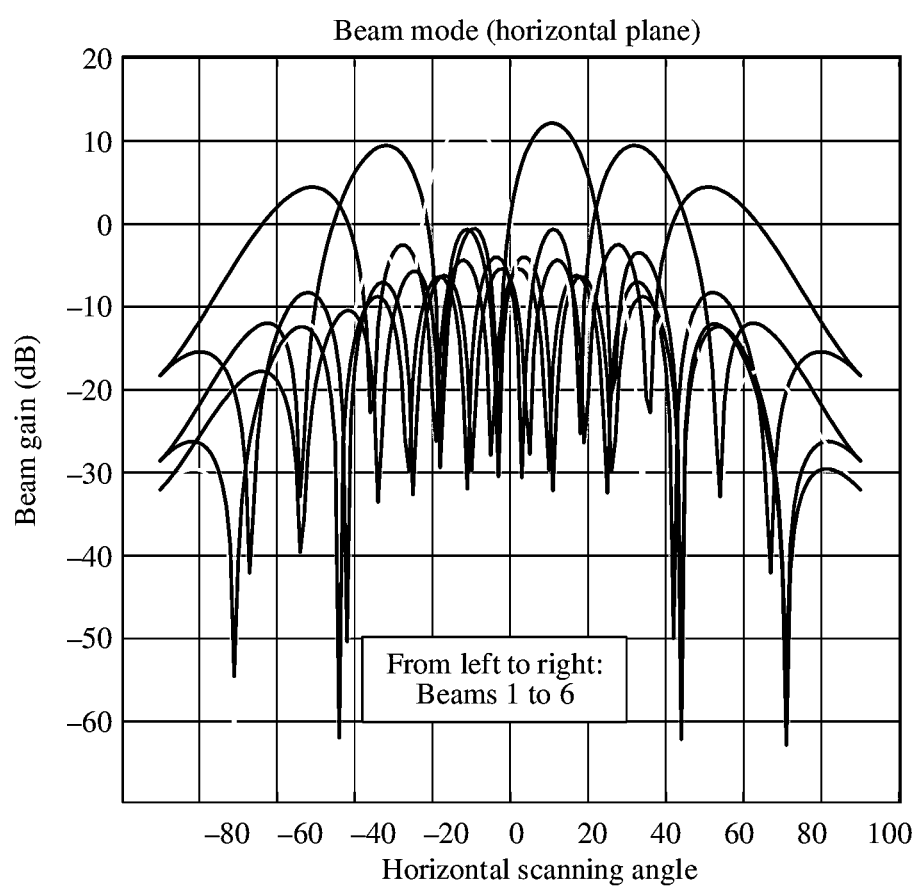
FIG. 7 is a schematic diagram of a beam gain mode according to an embodiment.

A beam radiation mode refers to a beam gain of a beam in different horizontal and vertical directions. As shown in FIG. 7, there are radiation modes of six beams on a horizontal cross section in the figure, namely, radiation modes of a plane corresponding to a vertical pitch angle of 0 degrees. FIG. 7 shows the following information: (1) a 3 db bandwidth of a beam; (2) a first nulling point beamwidth; (3) a distance from a main peak to a first side lobe; (4) a first side lobe/main lobe; and (5) a nulling point location. Usually, a pattern has two or more lobes. A lobe with a maximum radiation intensity is referred to as a main lobe, another lobe is referred to as a minor lobe or side lobe, and a side lobe in a direction opposite to the main lobe is referred to as a back lobe. On the sides of a maximum radiation direction of the main lobe, an included angle between two points at which a radiation intensity is reduced by 3 dB, in other words, a power density is reduced by half is defined as a lobe width, and is further referred to as a beam width, a main lobe width, or a half power beam width (HPBW). A beam in another plane, for example, a vertical cross section corresponding to an angle of a horizontal scanning angle, may also be represented according to a similar method.

In a 5G system, a bandwidth of a terminal device may dynamically change. When a service volume of the terminal device is relatively large, the 5G system may configure a large bandwidth for the terminal device. When a service volume of the terminal device is relatively small, the 5G system configures a small bandwidth for the terminal device, to provide communication for the terminal device. Communication by the terminal device is provided in a corresponding bandwidth part (BWP) by using a center frequency and a sampling rate of the corresponding BWP. In addition, the BWPs have one or more of different frequencies and different bandwidths, and different configurations, wherein the different configurations are used to adapt to different services.

In this embodiment, the terminal device first receives configuration information from a network device, and then the terminal device receives a reference signal. Further, the terminal device measures the reference signal based on the received configuration information, to obtain a measurement result. Finally, the terminal device reports the measurement result to a network, so that the network device positions the terminal device based on the measurement result.

The configuration information received by the terminal device from the network device may carry information about an association between a plurality of sets of frequency information and a plurality of sets of beam information, or may carry correction information. The terminal device obtains the measurement result based on different information carried in the configuration information. The following separately describes two cases.

1. The configuration information carries the information about the association between the plurality of sets of frequency information and the plurality of sets of beam information.

In this embodiment, the configuration information received by the terminal device from the network device carries the information about the association between the plurality of sets of frequency information and the plurality of sets of beam information. After receiving the reference signal, the terminal device obtains the measurement result based on the information about the association between the plurality of sets of frequency information and the plurality of sets of beam information, and then reports the measurement result to the network device.

Figure 8:
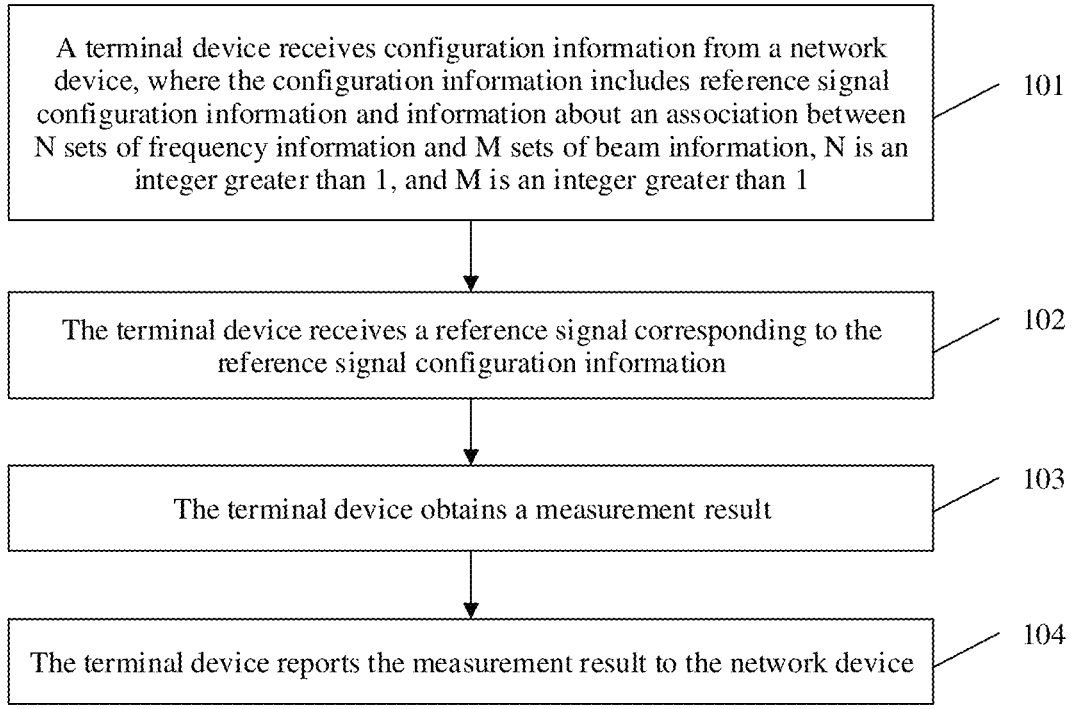
FIG. 8 is a schematic diagram of an embodiment of an angle positioning method according to an embodiment.

For details, refer to FIG. 8. FIG. 8 is a schematic diagram of an embodiment of an angle positioning method according to an embodiment. The embodiment of the angle positioning method in this embodiment includes the following operations.

101: A terminal device receives configuration information from a network device, where the configuration information includes reference signal configuration information and information about an association between N sets of frequency information and M sets of beam information, N is an integer greater than 1, and M is an integer greater than 1.

The terminal device receives the configuration information from the network device. The configuration information includes the reference signal configuration information and the information about the association between the N sets of frequency information and the M sets of beam information. The reference signal configuration information may include a bandwidth, a receive beam indication, a sequence, a density, a symbol location, or a periodicity. The reference signal configuration information has been defined in a standard. For details, refer to the definition in the standard. This imposes no limitation on this embodiment. An association relationship between a plurality of sets of frequency information and a plurality of sets of beam information may include an association relationship between beam radiation mode information, a reference signal, a frequency, and a radiation mode. In addition, the terminal device may further receive different reference signal identifiers corresponding to different reference signal configuration information of the network device, and the terminal device may accurately and quickly find reference signal configuration information based on the identifiers, so that feasibility of angle position is improved.

Optionally, N in the information about the association between the N sets of frequency information and the M sets of beam information is equal to M, that is, the frequency information and the beam information are in one-to-one correspondence. However, in an implementation of this embodiment, the information about the association between the frequency information and the beam information is configured with reference to examples shown in the following Table 1 and Table 2.

Table 1 is an example of an association relationship between frequency information and a positioning reference signal resource, and Table 2 is an example of a configuration relationship between frequency information and a channel state information reference signal resource. In actual application of at least one embodiment, the association information is configured in another configuration form, for example, configured by using signaling.

TABLE 1

|  | Positioning reference signal resource 1 | Positioning reference signal resource 2 |
| --- | --- | --- |
| Frequency information 1 | Beam information 11 | Beam information 12 |
| Frequency information 2 | Beam information 21 | Beam information 22 |
| Frequency information 3 | Beam information 31 | Beam information 32 |

TABLE 2

|  | Channel state information reference signal resource 1 | Channel state information reference signal resource 2 |
| --- | --- | --- |
| Frequency information 1 | Beam information 11 | Beam information 12 |
| Frequency information 2 | Beam information 21 | Beam information 22 |
| Frequency information 3 | Beam information 31 | Beam information 32 |

The beam information is a main lobe direction, a side lobe direction, a null-steering angle, a main lobe gain, a side lobe gain, a beam gain amplitude in one or more horizontal or vertical directions, or phase information of a beam gain that is of a beam. In actual application of at least one embodiment, the beam information may further include other information, for example, a center direction, namely, a maximum gain direction, of a beam, a carrier frequency or a center frequency corresponding to a beam ID or beam information, and a correspondence between one or more relative received powers of reference signals and an angle of departure of a base station.

Optionally, the frequency information is indicated by using an absolute radio frequency channel number (ARFCN). The frequency information may alternatively be included in a cell configuration, in other words, different beam information or different BWPs are configured for cells.

Optionally, the frequency information may correspond to a frequency range. As shown in Table 1 and Table 2, for example, the frequency information 1 corresponds to 28 GHz to 30 GHz, and the frequency information 2 corresponds to 30.5 GHz to 32 GHz. Alternatively, the frequency information may indicate a center frequency of the frequency range. For example, for a frequency f, the terminal device selects, for estimation, a beam radiation mode corresponding to frequency information that is in the frequency information and that is closest to the frequency. Optionally, the frequency information may alternatively be relative frequency information. For example, the frequency information is a frequency difference between a reference frequency and a measurement frequency, or a frequency ratio between a reference frequency and a measurement frequency.

Optionally, beam information corresponding to different frequency information is configured. Some frequency information is grouped, and frequency information in a same set shares one piece of beam information. For example, the network device indicates one cell group or one frequency information set, and frequency information in a same set shares one piece of beam information. When the frequency information indicates the frequency range, as shown in Table 3 and Table 4, the network device defines a frequency range (FR), and configures different beam information for different frequency ranges. Table 3 is an example of a configuration relationship between a frequency range name and a corresponding frequency range. Table 4 is an example of a configuration relationship between a frequency range name and a channel state information reference signal resource. In actual application of at least one embodiment, the association information is configured in another configuration form. Embodiments are not limited to the describe configuration forms described herein.

TABLE 3

| Frequency range name | Corresponding frequency range |
| --- | --- |
| FR 1 | 450 MHz to 6000 MHz |
| FR 2 | 24250 MHz to 52600 MHz |

TABLE 4

| Frequency range name | Channel state information reference signal resource 1 |
| --- | --- |
| FR 1 | Beam information 11 |
| FR 2 | Beam information 21 |

Optionally, in addition to the foregoing configuration manner, the network device may alternatively configure, for the terminal device, a correspondence between a reference frequency, a beam, and a frequency domain offset of a measurement frequency relative to the reference frequency. For example, the reference frequency of the terminal device is a center frequency or a carrier frequency of a current primary cell of the terminal device. Table 5 is an example of a configuration relationship between a frequency domain offset and a channel state information reference signal resource.

TABLE 5

| Frequency domain offset | Channel state information reference signal resource 1 | Channel state information reference signal resource 2 |
| --- | --- | --- |
| Offset 1 | Beam information 11 | Beam information 12 |
| Offset 2 | Beam information 21 | Beam information 22 |
| Offset 3 | Beam information 31 | Beam information 32 |

For example, configuration signaling of a correspondence between the channel state information reference signal resource, the beam information, and the frequency domain offset is in the following two forms.

In the first form, the signaling may include a channel state information reference signal resource set, where the channel state information reference signal resource set includes a resource set identifier corresponding to the channel state information reference signal resource set, one or more channel state information reference signal resources, one or more frequency domain offsets, and other information of the channel state information reference signal resource set. For example, as shown in Table 5, a plurality of channel state information reference signal resources may include the channel state information reference signal resource 1 and the channel state information reference signal resource 2, and a plurality of frequency domain offsets may include the offset 1, the offset 2, and the offset 3. The foregoing other information of the channel state information reference signal resource set may include a location of a station, an identifier of a station sending a channel state information reference signal resource, and a periodicity of the channel state information reference signal resource set.

Channel state information reference signal resource includes one or more pieces of beam radiation mode information, spatial filtering information, time and frequency domain resource mapping information, and periodicity information. Optionally, the beam radiation mode is associated with a frequency offset configured in the channel state information reference signal resource set. Optionally, the beam radiation mode is associated, in a one-to-one correspondence manner, with the frequency offset configured in the channel state information reference signal resource set, or the beam radiation mode is associated, in sequence, with the frequency offset configured in the channel state information reference signal resource set. The first piece of frequency offset information is associated with the first frequency offset, the second piece of frequency offset information is associated with the second frequency offset, and so on. As shown in Table 5, the channel state information reference signal resource 1 is used as an example to describe a configuration of the channel state information reference signal resource in detail. The terminal device obtains a resource identifier corresponding to the channel state information reference signal resource 1. For example, the identifier of the channel state information reference signal resource 1 is 1. The terminal device obtains beam information corresponding to the channel state information reference signal resource 1. In addition, the terminal device may further obtain spatial filtering information, namely, a resource-level beam indication or a quasi-colocation (QCL) relationship corresponding to the channel state information reference signal resource 1, and further obtain the beam radiation mode information and other information of the channel state information reference signal resource 1. As shown in Table 5, the offset 1 corresponds to the beam information 11, the offset 2 corresponds to the beam information 21, and the offset 3 corresponds to the beam information 31. The foregoing other information of the channel state information reference signal resource 1 includes a transmit power, a periodicity, time and frequency domain resource mapping information, or sequence information of the channel state information reference signal resource 1. In the foregoing configuration, the offsets in the frequency domain offsets and the beam information in the channel state information reference signal resources that are shown in Table 5 are in one-to-one correspondence.

In the second form, the signaling may include a channel state information reference signal resource set, where the channel state information reference signal resource set includes a resource set identifier corresponding to the channel state information reference signal resource set, a plurality of channel state information reference signal resources, and other information of the channel state information reference signal resource set. For example, as shown in Table 5, the plurality of channel state information reference signal resources may include the channel state information reference signal resource 1 and the channel state information reference signal resource 2. The foregoing other information of the channel state information reference signal resource set may include a location of a station, an identifier of a station sending a channel state information reference signal resource, and a periodicity of the channel state information reference signal resource set.

Channel state information reference signal resource may include one or more pieces of beam radiation mode information, spatial filtering information, time and frequency domain resource mapping information, and periodicity information. Optionally, the beam radiation mode information includes an association relationship between a frequency domain offset and beam information. As shown in Table 5, the channel state information reference signal resource 2 is used as an example to describe a configuration of the channel state information reference signal resource in detail. The terminal device obtains a resource identifier corresponding to the channel state information reference signal resource 2. For example, the identifier of the channel state information reference signal resource 2 is 2. The terminal device obtains beam information corresponding to the channel state information reference signal resource 2. In addition, the terminal device may further obtain spatial filtering information, namely, a resource-level beam indication or a QCL relationship corresponding to the channel state information reference signal resource 2, and further obtain the beam radiation mode information and other information of the channel state information reference signal resource 2. As shown in Table 5, the offset 1 corresponds to the beam information 12, the offset 2 corresponds to the beam information 22, and the offset 3 corresponds to the beam information 32. The foregoing other information of the channel state information reference signal resource 2 includes a transmit power, a periodicity, time and frequency domain resource mapping information, or sequence information of the channel state information reference signal resource 2.

Optionally, the correspondence between the beam information and the frequency domain offset in this embodiment is configured based on a transmission configuration indicator (TCI), indicating that a reference signal associated with a TCI state or QCL information may use beam information that is in the TCI state or the QCL information.

Transmit beam information of a reference signal is indicated by using QCL information. For example, a reference signal A and a reference signal B are spatially quasi-colocated indicates that the reference signal A and the reference signal B is received by using a same receive beam, or is sent by using a same transmit beam. Therefore, the network device may configure one or more pieces of QCL information in a TCI state, and then associate the TCI state with a different reference signal, which indicates that the associated reference signal and a reference signal that is in the TCI state meet the configured QCL information.

For example, for ease of understanding, the beam information is configured in the TCI state or the QCL information in the following form.

The signaling may include a TCI state, where the TCI state includes a TCI state identifier corresponding to the TCI state and a plurality of QCL relationships, a QCL relationship includes one piece of QCL information, and the QCL information includes a sending cell identifier of a QCL information reference information resource, a BWP of the QCL information reference information resource, a type of a reference signal indicated by a QCL and a signal identifier of the reference signal, a QCL type, and beam information. The QCL type includes a QCL type A, a QCL type B, a QCL type C, and a QCL type D, and the QCL type D is used to indicate spatial information. In addition, there is a correspondence between the beam information and a frequency range or an offset. For a relationship configuration, refer to content shown in Table 4 and Table 5. Details are not described herein again.

The terminal device obtains the TCI state, and the TCI state includes the TCI state identifier and the plurality of QCL relationships. For example, the TCI state identifier is 1, the TCI state includes a QCL relationship 1 and a QCL relationship 2, the QCL relationship 1 includes QCL information 1, and the QCL relationship 2 includes QCL information 2.

In the foregoing configuration manner, when the reference signal is a CSI-RS, and the CSI-RS is associated with a TCI state, the terminal device may determine that beam information of the CSI-RS is the same as beam information in the TCI state, in other words, transmit beam information of the CSI-RS is the same as the configured beam information in the TCI, or transmit beam information of the CSI-RS is the same as configured beam information in QCL information. In addition, the QCL information may not be configured in a TCI state, but is directly configured in a related configuration of the reference signal.

102: The terminal device receives a reference signal corresponding to the reference signal configuration information.

In this embodiment, after the terminal device receives the configuration information from the network device in operation 101, the terminal device positions the terminal device by receiving the reference signal corresponding to the reference signal configuration information sent by the network device.

103: The terminal device obtains a measurement result, where the measurement result is obtained by measuring the reference signal based on an association relationship between frequency information and beam information.

In this embodiment, after receiving, in operation 102, the reference signal corresponding to the reference signal configuration information sent by the network device, the terminal device may measure the reference signal based on the association relationship between the frequency information and the beam information, to obtain the measurement result.

Optionally, when the beam information is a correspondence between a plurality of relative received powers of reference signals and a plurality of angles of departure of the base station, Table 6 is an example of a configuration relationship between a plurality of relative received powers of reference signals and a plurality of angles of departure of the base station.

TABLE 6

| | | | |
|---|---|---|---|
| Beam information 11 | Angle of departure 1 of the base station | Relative received power 11 of a reference signal 1 | Relative received power 12 of a reference signal 2 |
| Beam information 21 | Angle of departure 2 of the base station | Relative received power 21 of the reference signal 1 | Relative received power 22 of the reference signal 2 |
| Beam information 31 | Angle of departure 3 of the base station | Relative received power 31 of the reference signal 1 | Relative received power 32 of the reference signal 2 |

A plurality of different relative received powers of reference signals may correspond to one angle of departure of the base station, and the beam information is a correspondence between the plurality of different relative received powers of reference signals and the angle of departure of the base station. The relative received power is a relative power obtained by normalizing a received power of a specified reference signal, and the received power of the specified reference signal is a maximum received power of the reference signal, a received power corresponding to a reference signal with a maximum amplitude, or a received power corresponding to a reference signal with a minimum identifier. Optionally, the relative received power is a power value obtained by normalizing a sum by using a constant C, where the sum is of received powers of the reference signals in a set corresponding to angles of departure. C is configured by the network device, or C is determined according to a protocol. For example, C is equal to 1.

Therefore, after obtaining reference signals, the terminal device may further obtain received powers of different reference signals in different frequency ranges through measurement, and then determine a plurality of groups of angles of departure based on the received powers in the different frequency ranges and the information about the association between the N sets of frequency information and the M sets of beam information. In the different frequency ranges, the terminal device selects an angle of departure with a highest proximity degree from the plurality of groups of angles of departure as angle information, and the angle information is included in the measurement result.

For example, the different frequency ranges are 28 GHz to 30 GHz and 30 GHz to 32 GHz. First, the terminal device measures actual received powers of different reference signals in 28 GHz to 30 GHz and 30 GHz to 32 GHz. Then the terminal device selects a possible angle of departure A in the frequency range of 28 GHz to 30 GHz, obtains, based on the M sets of beam information that are configured by the network device and that are in the frequency range of 28 GHz to 30 GHz, relative values of beam gains of M groups of beams corresponding to the angle of departure A, and compares the relative values with relative values of the actual received powers in the range of 28 GHz to 30 GHz, to determine a proximity degree between the relative values. The terminal device further selects a possible angle of departure B, obtains, based on the M sets of beam information that are configured by the network device and that are in the frequency range of 28 GHz to 30 GHz, relative values of beam gains of M groups of beams corresponding to the angle of departure B, and compares the relative values with the relative values of the actual received powers in the range of 28 GHz to 30 GHz, to determine a proximity degree between the relative values. When the terminal device obtains proximity degrees between relative values of beam gains corresponding to angles of departure in the range of 28 GHz to 30 GHz and the relative values of the actual received powers in the range of 28 GHz to 30 GHz, further, for the frequency range of 30 GHz to 32 GHz, similar operations are repeated. When the terminal device obtains proximity degrees between relative values of beam gains corresponding to the angles of departure in the range of 30 GHz to 32 GHz and relative values of the actual received powers in the range of 30 GHz to 32 GHz, the terminal device compares the obtained proximity degrees in the two frequency ranges, and uses an angle of departure corresponding to a highest proximity degree as the angle information, where the angle information belongs to the measurement result.

104: The terminal device reports the measurement result to the network device.

In this embodiment, after the terminal device obtains the measurement result in operation 103, the terminal device reports the measurement result to the network device, so that the network device determines a location of the terminal device based on the measurement result, to complete positioning by the terminal device. The network device is a positioning device or a base station.

Optionally, the measurement result reported by the terminal device to the network device may further include used measurement frequency information or a used beam information index. In the foregoing manner, the measurement result sent by the terminal device to the network device includes information related to the measurement result, so that the network device more accurately finds frequency-related information corresponding to the measurement result. In this way, angle positioning efficiency of the network device is improved.

In this embodiment, according to operations 101 to 104, when the terminal device receives the configuration information sent by the network device, the terminal device may receive at least two types of association relationships that are between frequency information and beam information and that are configured by the network device. Therefore, after receiving the reference signal, the terminal device obtains the measurement result by using different association relationships between the frequency information and the beam information at different frequencies, so that a beam direction offset caused by a beam squint phenomenon is reduced, accuracy of the measurement result is improved, and accuracy of an angle obtained by the network device is improved. In this way, angle positioning accuracy is improved.

2. The configuration information carries the correction information. In this embodiment, the configuration information received by the terminal device from the network device carries the correction information. After receiving the reference signal, the terminal device corrects an initial measurement result based on the correction information to obtain the measurement result, and then reports the measurement result to the network device.

Figure 9:
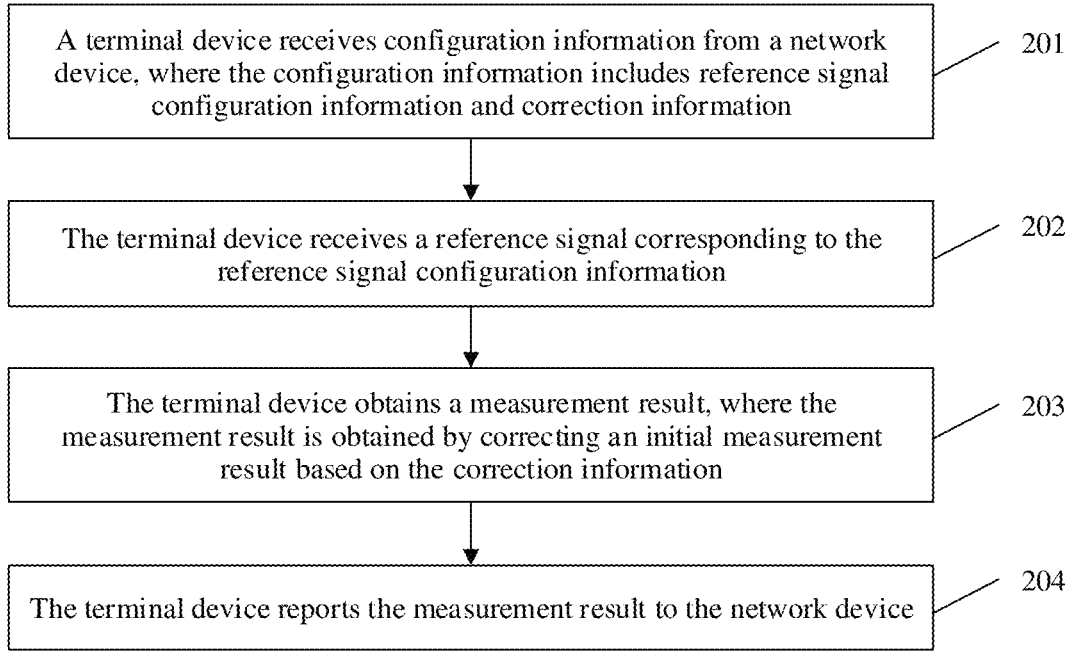
FIG. 9 is a schematic diagram of another embodiment of an angle positioning method according to an embodiment.

For details, refer to FIG. 9. FIG. 9 is a schematic diagram of an embodiment of an angle positioning method according to an embodiment. The embodiment of the angle positioning method in this embodiment includes the following operations.

201: A terminal device receives configuration information from a network device, where the configuration information includes reference signal configuration information and correction information.

In this embodiment, the terminal device first receives the configuration information from the network device. The configuration information includes the reference signal configuration information and the correction information. The correction information is associated with frequency information. The frequency information is similar to the frequency information described in operation 101. Details are not described herein again.

Optionally, the configuration information received by the terminal device further includes an association relationship between reference frequency information and beam information. The association relationship is used to obtain an initial measurement result mentioned in a subsequent operation 203. The beam information is similar to the beam information described in operation 101. Details are not described herein again.

In the foregoing manner, the terminal device may further obtain the association relationship between the reference frequency information and the beam information, to obtain the initial measurement result. Therefore, operations in this embodiment are more complete, and implementability of angle position is improved.

Optionally, the correction information may include beam correction information, angle correction information, or power correction information, and the angle correction information is angle offset compensation information or angle mapping information.

In this embodiment, the beam correction information means that beam information of different beams or reference signal resources is corrected and adjusted in different frequencies or frequency ranges. An adjustment object is a value of a related parameter of the beam information. An adjustment value is related to a frequency. For example, the beam correction information includes adjustment information of a main lobe direction, a side lobe direction, a null-steering angle, a main lobe gain, a side lobe gain, a beam gain amplitude in one or more horizontal or vertical directions, phase information of a beam gain, and a center direction, namely, a maximum gain direction, that are of a beam. The terminal device may correct the beam information based on the beam correction information. For example, the correction information indicates an offset degree of the main lobe direction, the side lobe direction, or the null-steering angle, an amount by which the main lobe gain, the side lobe gain, or the beam gain amplitude in one or more horizontal or vertical directions is increased or decreased, an adjustment amount of the phase information of the beam gain or the center direction, namely, the maximum gain direction, of the beam, where the parameters are of the beam, and the adjustment amount is associated with frequency information, a beam index, and a reference signal index.

For example, Table 7 shows an example of a configuration relationship between a channel state information reference signal resource and frequency information. In actual application of at least one embodiment, the beam correction information may alternatively be configured by using a beam index and frequency information. An example is similar to that in Table 7, and details are not described herein again. The following Table 7 is one example of configuring the beam correction information. In actual application of at least one embodiment, the beam correction information is configured in another configuration form. Embodiments are not limited to the describe configuration forms described herein.

TABLE 7

|  | Channel state information reference signal resource 1 | Channel state information reference signal resource 2 |
| --- | --- | --- |
| Frequency information 1 | Beam correction information 11 | Beam correction information 12 |
| Frequency information 2 | Beam correction information 21 | Beam correction information 22 |
| Frequency information 3 | Beam correction information 31 | Beam correction information 32 |

For example, the angle correction information is configured as shown in the following Table 8. Table 8 shows an example of a configuration relationship between angle information and frequency information. The angle correction information may alternatively be configured by using angle information and a frequency offset. One example is similar to that in Table 8, and details are not described herein again. In actual application of at least one embodiment, the angle correction information is configured in another configuration form. Embodiments are not limited to the describe configuration forms described herein.

TABLE 8

|  | Frequency information 1 | Frequency information 2 |
| --- | --- | --- |
| Angle information 1 | Angle correction information 11 | Angle correction information 12 |
| Angle information 2 | Angle correction information 21 | Angle correction information 22 |
| Angle information 3 | Angle correction information 31 | Angle correction information 32 |

The angle correction information is an angle offset compensation amount, for example, −3° or −1°, or is an angle range, for example, 1° to 2°. The angle correction value may also be obtained through calculation by using angle information before correction, frequency information, and the angle correction information. For example, angle information after correction=angle information before correction+ the angle correction information*(the frequency information−a reference frequency).

For example, the power correction information is configured as shown in the following Table 9. Table 9 shows an example of a configuration relationship between reference information and frequency information. In actual application of at least one embodiment, the power correction information is configured in another configuration form. Embodiments are not limited to the describe configuration forms described herein.

TABLE 9

|  | Frequency information 11 | Frequency information 12 |
| --- | --- | --- |
| Reference information 1 | Power correction information 11 | Power correction information 12 |
| Reference information 2 | Power correction information 21 | Power correction information 22 |
| Reference information 3 | Power correction information 31 | Power correction information 32 |

The power correction information is a power offset compensation amount, for example, received power value compensation of −4 dB of a reference signal, which mainly indicates that the terminal device compensates for a measurement result of the reference signal on a frequency band that meets the frequency information 1, for example, compensate −4 dB for a power of the corresponding reference signal received by the terminal device within the frequency band.

For example, configuration signaling of the beam correction information is in the following two forms.

In the first form, the signaling may include a channel state information reference signal resource set, where the channel state information reference signal resource set includes a resource set identifier corresponding to the channel state information reference signal resource set, one or more channel state information reference signal resources, one or more frequency domain offsets, and other information of the channel state information reference signal resource set. For example, as shown in Table 7, a plurality of channel state information reference signal resources may include the channel state information reference signal resource 1 and the channel state information reference signal resource 2. As shown in Table 5, a plurality of frequency domain offsets may include the offset 1, the offset 2, and the offset 3. The foregoing other information of the channel state information reference signal resource set may include a location of a station, an identifier of a station sending a channel state information reference signal resource, and a periodicity of the channel state information reference signal resource set.

Channel state information reference signal resource includes one or more pieces of beam correction information, spatial filtering information, time and frequency domain resource mapping information, and periodicity information. Optionally, the beam correction information is associated with a frequency offset configured in the channel state information reference signal resource set. Optionally, the beam correction information is associated, in a one-to-one correspondence manner, with the frequency offset configured in the channel state information reference signal resource set, or the beam correction information is associated, in sequence, with the frequency offset configured in the channel state information reference signal resource set. The first piece of beam correction information is associated with the first frequency offset, the second piece of beam correction information is associated with the second frequency offset, and so on. As shown in Table 7, the channel state information reference signal resource 1 is used as an example to describe a configuration of the channel state information reference signal resource in detail. The terminal device obtains a resource identifier corresponding to the channel state information reference signal resource 1. For example, an identifier of the channel state information reference signal resource 1 is 1. The terminal device obtains beam information corresponding to the channel state information reference signal resource 1. In addition, the terminal device may further obtain spatial filtering information, namely, a resource-level beam indication or a QCL relationship corresponding to the channel state information reference signal resource 1, and further obtain beam correction information and other information of the channel state information reference signal resource 1. As shown in Table 7, the frequency information 11 corresponds to the beam correction information 11, the frequency information 2 corresponds to the beam correction information 21, and the frequency information 3 corresponds to the beam correction information 31. The foregoing other information of the channel state information reference signal resource 1 includes a transmit power, a periodicity, time and frequency domain resource mapping information, or sequence information of the channel state information reference signal resource 1. In the foregoing configuration, the frequency information shown in Table 7 and the beam correction information in the channel state information reference signal resource are in one-to-one correspondence.

In the second form, the signaling may include a channel state information reference signal resource set, where the channel state information reference signal resource set includes a resource set identifier corresponding to the channel state information reference signal resource set, a plurality of channel state information reference signal resources, and other information of the channel state information reference signal resource set. For example, as shown in Table 7, the plurality of channel state information reference signal resources may include the channel state information reference signal resource 1 and the channel state information reference signal resource 2. The foregoing other information of the channel state information reference signal resource set may include a location of a station, an identifier of a station sending a channel state information reference signal resource, or a periodicity of the channel state information reference signal resource set.

Channel state information reference signal resource may include an association relationship between one or more pieces of beam correction information and a frequency domain offset, spatial filtering information, time and frequency domain resource mapping information, and periodicity information. As shown in Table 7, the channel state information reference signal resource 2 is used as an example to describe a configuration of the channel state information reference signal resource in detail. The terminal device obtains a resource identifier corresponding to the channel state information reference signal resource 2. For example, an identifier of the channel state information reference signal resource 2 is 2. The terminal device obtains beam information corresponding to the channel state information reference signal resource 2. In addition, the terminal device may further obtain spatial filtering information, namely, a resource-level beam indication or a QCL relationship corresponding to the channel state information reference signal resource 2, and further obtain beam correction information and other information of the channel state information reference signal resource 2. As shown in Table 7, the frequency information 1 corresponds to the beam correction information 12, the frequency information 2 corresponds to the beam correction information 22, and the frequency information 3 corresponds to the beam correction information 32. The foregoing other information of the channel state information reference signal resource 2 includes a transmit power, a periodicity, time and frequency domain resource mapping information, or sequence information of the channel state information reference signal resource 2.

Optionally, a correspondence between the beam correction information and the frequency information in this embodiment is configured based on a transmission configuration indicator, indicating that a reference signal associated with a TCI state or QCL information may use beam information in the TCI state or the QCL information.

Transmit beam information of a reference signal is indicated by using QCL information. For example, a reference signal A and a reference signal B spatially quasi-colocated indicates that the reference signal A and the reference signal B is received by using a same receive beam, or is sent by using a same transmit beam. Therefore, the network device may configure one or more pieces of QCL information in a TCI state, and then associate the TCI state with a different reference signal, which indicates that the associated reference signal and a reference signal that is in the TCI state meet the configured QCL information.

For example, for ease of understanding, a manner of configuring the beam correction information in the TCL state or the QCL information is in the following form.

The signaling may include a TCI state, where the TCI state may include a TCI state identifier corresponding to the TCI state and a plurality of QCL relationships, a QCL relationship includes one piece of QCL information, and QCL information includes a sending cell identifier of a QCL information reference information resource, a BWP of the QCL information reference information resource, a type of a reference signal indicated by a QCL and a signal identifier of the reference signal, a QCL type, and an association relationship between beam correction information and a frequency domain offset, where the QCL type includes a QCL type A, a QCL type B, a QCL type C, and a QCL type D, and the QCL type D is used to indicate spatial information.

The terminal device obtains the TCI state, and the TCI state includes the TCI state identifier and the plurality of QCL relationships. For example, the TCI state identifier is 1, the TCI state includes a QCL relationship 1 and a QCL relationship 2, the QCL relationship 1 includes QCL information 1, and the QCL relationship 2 includes QCL information 2.

In the foregoing configuration manner, when the reference signal is a CSI-RS, and the CSI-RS is associated with the TCI state, the terminal device may determine that beam correction information of the CSI-RS is the same as beam correction information in the TCI state, in other words, correction information of a transmit beam of the CSI-RS is the same as the configured beam correction information in the TCI state, or correction information of a transmit beam of the CSI-RS is the same as the configured beam correction information in the QCL information. In addition, the QCL information may not be configured in the TCI state, but is directly configured in a related configuration of the reference signal.

A configuration of frequency correction information is similar to the configuration of the beam correction information, and details are not described herein again.

In the foregoing manner, the correction information includes three types of different correction information, and is configured in different manners, so that the terminal device obtains a plurality of types of correction information, and perform selection and application based on a situation so that feasibility of angle positioning is improved.

202: The terminal device receives a reference signal corresponding to the reference signal configuration information.

In this embodiment, after the terminal device receives the configuration information from the network device in operation 201, the terminal device positions the terminal device by receiving the reference signal corresponding to the reference signal configuration information sent by the network device.

203: The terminal device obtains a measurement result, where the measurement result is obtained by correcting the initial measurement result based on the correction information.

In this embodiment, after receiving, in operation 202, the reference signal corresponding to the reference signal configuration information sent by the network device, the terminal device may measure the reference signal based on the association relationship between frequency information and beam information, to obtain the initial measurement result, and then correct the initial measurement result based on the correction information, to obtain the measurement result.

Because the correction information may include the beam correction information, the angle correction information, or the power correction information, the following separately describes in detail how to correct the initial measurement result based on the beam correction information and the angle correction information.

The beam correction information is related to one or more of a wavelength $\lambda$, a carrier frequency $f_c$, a beam weight value $w_i$, an array element gain and a radiation mode, an array element arrangement manner, an array element spacing and a quantity of array elements, an array element dimension, and a difference between an actual frequency $f_i$ and the carrier frequency $f_c$. An arrangement manner of array elements is a linear array, a planar array, an L-shaped array, or a circular array. The array element gain and the radiation mode include a gain of an array element in each direction or a fitting function used to fit a gain of an array element.

Beam correction information is configured for reference signal received powers at different frequencies, and the beam correction information at the different frequencies is determined through calculation according to the following formula. In actual application of at least one embodiment, the beam correction information configured for the reference signal received powers at the different frequencies is determined in another calculation manner. Embodiments are not limited to the describe configuration forms described herein.

$$e^{j*2*pi*d*\left(\frac{\sin\theta}{c}\right)*(f_i-f_c)}$$

c is a speed of light, $f_i$ is the actual frequency, $f_c$ is the carrier frequency, $\theta$ is a different beam direction, and d is a constant configured by a base station. d is an antenna spacing, and d is measured by using a wavelength of a center frequency as a unit. $f_i-f_c$ is a frequency offset value, and may correspond to a frequency offset amount configured by the base station.

In addition, the beam correction information may alternatively be configured for reference signal received powers in different frequency bands. A calculation manner is similar to the calculation formula of the different frequencies, and details are not described herein again.

The angle correction information is mainly used to configure an angle correction coefficient, and the angle correction coefficient is related to the difference between the actual frequency $f_i$ and the carrier frequency $f_c$. Angle information $\beta$ after compensation is a mapping or function relationship jointly determined by using at least two of the actual frequency $f_i$, the carrier frequency $f_c$, and an initial measurement result obtained by using the carrier frequency. Several optional forms include the following two. In actual application of at least one embodiment, the initial measurement result is corrected by using the beam correction information in another correction form. Embodiments are not limited to the describe configuration forms described herein.

1. The network device configures a mapping table between angle information $\alpha$ in which a beam squint is not compensated and the angle information $\beta$ in which the beam squint is compensated, and determines, through table lookup, an AOD angle $\beta$ in which the beam squint is compensated. For example, $\beta=\arcsin(\zeta*\alpha)$, $\beta=\arcsin(\zeta*\sin\alpha)$, $\beta=\zeta*\sin\alpha$, $\beta=\zeta\alpha$, $\beta=\zeta+\alpha$, and $\beta=-\zeta+\alpha$, where $\zeta$ is an angle correction coefficient.

For example, a mapping relationship between the angle information $\alpha$ in which the beam squint is not compensated and the angle information $\beta$ in which the beam squint is compensated is configured as shown in the following Table 10.

TABLE 10

|  | Angle information $\alpha1$ | Angle information $\alpha2$ |
|---|---|---|
| Frequency information 1 | Angle information $\beta11$ | Angle information $\beta12$ |
| Frequency information 2 | Angle information $\beta21$ | Angle information $\beta22$ |

2. The beam correction information may not be configured by the network device for the terminal device. The terminal device directly performs an operation, for example, by using a difference, a ratio, and an additive inverse and a derivative that correspond to the difference or the ratio, between the reference frequency and the actual measurement frequency, to obtain the beam correction information.

204: The terminal device reports the measurement result to the network device.

In this embodiment, after the terminal device obtains the measurement result in operation 203, the terminal device reports the measurement result to the network device, so that the network device determines a location of the terminal device based on the measurement result, to complete positioning by the terminal device.

Optionally, the measurement result reported by the terminal device to the network device may further include used measurement frequency information or a used beam information index. In the foregoing manner, the measurement result sent by the terminal device to the network device includes information related to the measurement result, so that the network device more accurately finds frequency-related information corresponding to the measurement result. In this way, angle positioning efficiency of the network device is improved.

In this embodiment, according to operations 201 to 204, the terminal device receives the correction information configured by the network device, and corrects the initial measurement result based on the correction information, in other words, corrects a beam direction offset caused by a beam squint phenomenon, obtains the measurement result, and reports the measurement result to the network device, to reduce the beam direction offset caused by the beam squint phenomenon, improve accuracy of the measurement result, and improve accuracy of an angle obtained by the network device. In this way, accuracy of angle positioning is improved.

The examples in FIG. 8 and FIG. 9 are presented to help persons skilled in the art to understand embodiments, and are not intended to limit embodiments to scenarios in the examples. Persons skilled in the art are able to make various equivalent modifications or changes according to the examples shown in FIG. 8 and FIG. 9, and such modifications or changes also fall within the scope of embodiments described herein.

The solutions in embodiments are appropriately combined for use, and explanations or descriptions of terms in embodiments are mutually referenced or explained in embodiments describe herein.

Sequence numbers of the foregoing processes do not mean execution sequences in various embodiments. The execution sequences of the processes are determined according to functions and internal logic of the processes, and are not intended to limit embodiments.

The foregoing describes in detail the angle positioning method according to embodiments with reference to FIG. 1 to FIG. 9. The following describes an angle positioning apparatus according to embodiments with reference to FIG. 10 to FIG. 12. The technical features described in the method embodiments are also applicable to the following apparatus embodiments.

Figure 10:
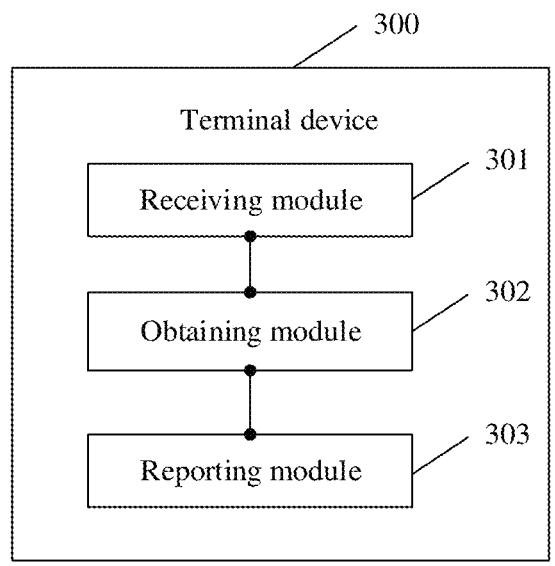
FIG. 10 is a schematic diagram of an embodiment of a terminal device according to an embodiment.

FIG. 10 is a schematic diagram of an embodiment of a terminal device 300 according to an embodiment. The terminal device 300 includes:
a receiving module 301, configured to receive configuration information from a network device, where the configuration information includes reference signal configuration information and information about an association between N sets of frequency information and M sets of beam information, N is an integer greater than 1, and M is an integer greater than 1, where
the receiving module 301 is further configured to receive a reference signal corresponding to the reference signal configuration information;
an obtaining module 302, configured to obtain a measurement result, where the measurement result is obtained by measuring the reference signal based on an association relationship between frequency information and beam information; and
a reporting module 303, configured to report the measurement result to the network device.

In an optional implementation, based on the embodiment corresponding to FIG. 10, in another embodiment of the terminal device 300 provided in this embodiment, the obtaining module 302 is further configured to obtain a reference signal received power.

The obtaining module 302 is further configured to obtain the measurement result, where the measurement result includes angle information, the angle information is related to the received power and the information about the association between the N sets of frequency information and the M sets of beam information.

In an optional implementation, based on the embodiment corresponding to FIG. 10, in another embodiment of the terminal device 300 provided in this embodiment, N is equal to M.

In an optional implementation, based on the embodiment corresponding to FIG. 10, in another embodiment of the terminal device 300 provided in this embodiment, the frequency information is indicated by using an absolute radio frequency channel number.

In an optional implementation, based on the embodiment corresponding to FIG. 10, in another embodiment of the terminal device 300 provided in this embodiment, the frequency information indicates a frequency range, or the frequency information indicates a center frequency in the frequency range.

In an optional implementation, based on the embodiment corresponding to FIG. 10, in another embodiment of the terminal device 300 provided in this embodiment, the beam information includes one or more of the following information:
a main lobe width, a main lobe direction, a beam gain in one or more directions, a beam side lobe width, and a side lobe direction.

In an optional implementation, based on the embodiment corresponding to FIG. 10, in another embodiment of the terminal device 300 provided in this embodiment, the measurement result further includes measurement frequency information or a beam information index.

Figure 11:
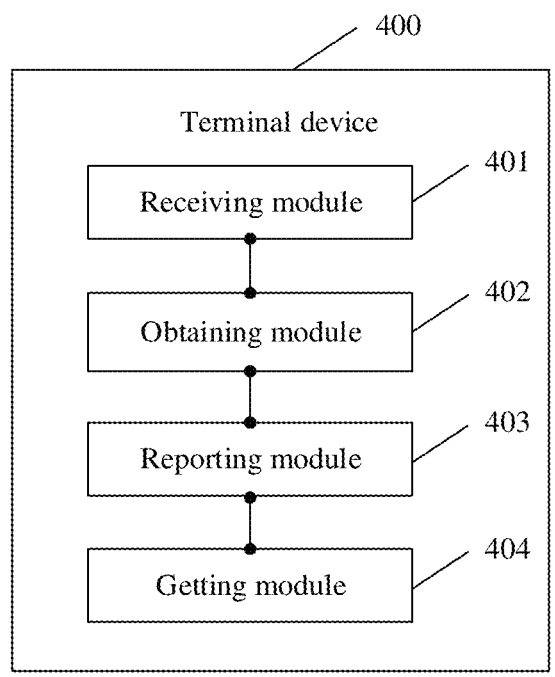
FIG. 11 is a schematic diagram of another embodiment of a terminal device according to an embodiment.

FIG. 11 is a schematic diagram of another embodiment of a terminal device according to an embodiment. The terminal device 400 includes:
a receiving module 401, configured to receive configuration information from a network device, where the configuration information includes reference signal configuration information and correction information, where
the receiving module 401 is further configured to receive a reference signal corresponding to the reference signal configuration information;
an obtaining module 402, configured to obtain a measurement result, where the measurement result is obtained by correcting an initial measurement result based on the correction information; and
a reporting module 403, configured to report the measurement result to the network device.

In an optional implementation, based on the embodiment corresponding to FIG. 11, in another embodiment of the terminal device 400 provided in this embodiment, the configuration information further includes an association relationship between reference frequency information and beam information, and the initial measurement result is obtained by measuring the reference signal based on the association relationship between the reference frequency information and the beam information.

In an optional implementation, based on the embodiment corresponding to FIG. 11, in another embodiment of the terminal device 400 provided in this embodiment, the obtaining module 402 is further configured to obtain a reference signal received power, where the received power is obtained by measuring the reference signal based on the association relationship between the reference frequency information and the beam information.

The terminal device 400 further includes a getting module 404, configured to obtain the initial measurement result based on the received power.

The obtaining module 402 is further configured to obtain the measurement result based on the initial measurement result and the correction information.

In an optional implementation, based on the embodiment corresponding to FIG. 11, in another embodiment of the terminal device 400 provided in this embodiment, the reference frequency information is indicated by using an absolute radio frequency channel number.

In an optional implementation, based on the embodiment corresponding to FIG. 11, in another embodiment of the terminal device 400 provided in this embodiment, the reference frequency information indicates a frequency range, or the reference frequency information indicates a center frequency in the frequency range.

In an optional implementation, based on the embodiment corresponding to FIG. 11, in another embodiment of the terminal device 400 provided in this embodiment, the beam information includes one or more of the following information:

a main lobe width, a main lobe direction, a beam gain in one or more directions, a beam side lobe width, or a side lobe direction.

In an optional implementation, based on the embodiment corresponding to FIG. 11, in another embodiment of the terminal device 400 provided in this embodiment, the correction information includes one or more of the following information:

beam correction information, angle correction information, or power correction information.

In an optional implementation, based on the embodiment corresponding to FIG. 11, in another embodiment of the terminal device 400 provided in this embodiment of this application, the angle correction information includes angle offset compensation information or an angle mapping table.

In an optional implementation, based on the embodiment corresponding to FIG. 11, in another embodiment of the terminal device 400 provided in this embodiment, the measurement result further includes measurement frequency information or a beam information index.

Figure 12:
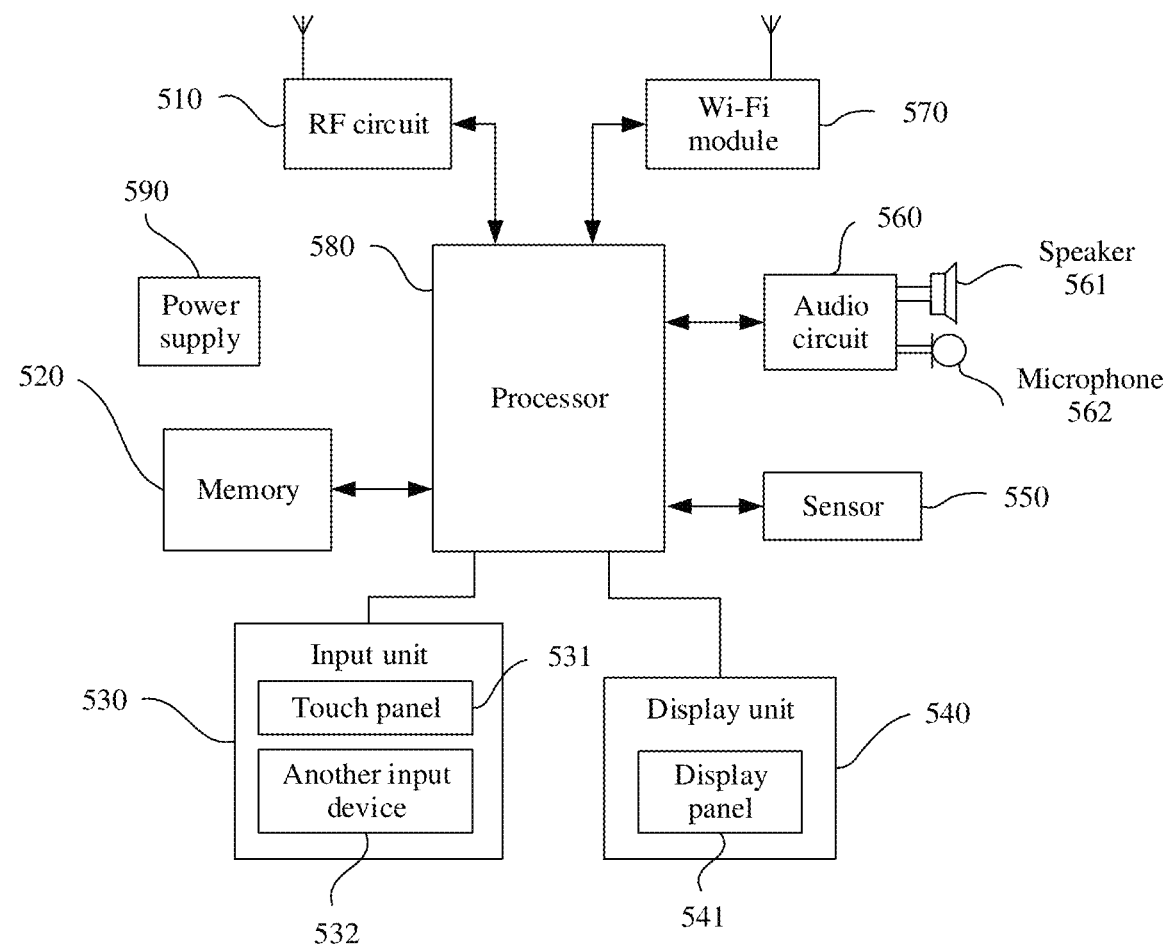
FIG. 12 is a schematic diagram of a structure of a terminal device according to an embodiment.

An embodiment of this application further provides a terminal device. As shown in FIG. 12, for ease of description, a part related to this embodiment is shown. For technical details that are not disclosed, refer to the method part in embodiments of this application. The terminal device is any terminal device including a mobile phone, a tablet computer, a PDA (Personal Digital Assistant), a POS (Point of Sales), a vehicle-mounted computer, and the like. For example, the terminal device is the mobile phone.

FIG. 12 is a block diagram of a partial structure of a mobile phone related to a terminal device according to an embodiment of this application. Refer to FIG. 12. The mobile phone includes components such as a radio frequency (RF) circuit 510, a memory 520, an input unit 530, a display unit 540, a sensor 550, an audio circuit 560, a wireless fidelity (Wi-Fi) module 570, a processor 580, and a power supply 590. Persons skilled in the art may understand that, the structure of the mobile phone shown in FIG. 12 does not constitute a limitation on the mobile phone. The mobile phone may include more or fewer components than those shown in the figure, or combine some components, or have different component arrangements.

The following describes components of the mobile phone in detail with reference to FIG. 12.

The RF circuit 510 is configured to receive or send a signal in an information receiving or sending process or a call process; particularly, after receiving downlink information of a base station, send the downlink information to the processor 580 for processing; and send designed uplink data to the base station. The RF circuit 510 usually includes but is not limited to an antenna, at least one amplifier, a transceiver, a coupler, a low noise amplifier (LNA), a duplexer, and the like. In addition, the RF circuit 510 may further communicate with a network and another device through wireless communication. The foregoing wireless communication may use any communication standard or protocol, including but not limited to: a global system for mobile communications (GSM), a general packet radio service (GPRS), code division multiple access (CDMA), wideband code division multiple access (WCDMA), long term evolution (LTE), an email, a short message service (SMS), and the like.

The memory 520 is configured to store a software program and a module. The processor 580 runs the software program and the module stored in the memory 520 to perform various function applications of the mobile phone and data processing. The memory 520 may mainly include a program storage area and a data storage area. The program storage area may store an operating system, an application program to implement at least one function (such as a sound playing function or an image playing function), and the like. The data storage area may store data (such as audio data or a phone book) created based on use of the mobile phone, and the like. In addition, the memory 520 may include a high-speed random access memory, and may further include a non-volatile memory, such as at least one magnetic disk storage device, a flash memory device, or another volatile solid-state storage device.

The input unit 530 is configured to receive entered number or character information, and generate signal input related to a user setting and function control of the mobile phone. The input unit 530 may include a touch panel 531 and another input device 532. The touch panel 531 is further referred to as a touchscreen and may collect a touch operation (such as an operation performed by a user on the touch panel 531 or near the touch panel 531 by using any proper object or accessory, such as a finger or a stylus) performed by the user on or near the touch panel 531, and drive a corresponding connection apparatus based on a preset program. Optionally, the touch panel 531 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into coordinates of a touch point, and then sends the coordinates of the touch point to the processor 580. In addition, the touch controller receives and executes a command sent by the processor 580. In addition, the touch panel 531 is implemented by using a plurality of types, such as a resistive type, a capacitive type, an infrared type, and a surface acoustic wave type. In addition to the touch panel 531, the input unit 530 may further include another input device 532. The another input device 532 may include but is not limited to one or more of a physical keyboard, a function key (for example, a volume control press key or a power on/off press key), a trackball, a mouse, a joystick, and the like.

The display unit 540 is configured to display information entered by the user or information provided for the user, and various menus of the mobile phone. The display unit 540 may include a display panel 541. Optionally, the display panel 541 is configured in a form of a liquid crystal display (LCD), an organic light-emitting diode (OLED), and the like. Further, the touch panel 531 may cover the display panel 541. After detecting a touch operation on or near the touch panel 531, the touch panel 531 transmits information about the touch operation to the processor 580 to determine a touch event type, and then the processor 580 provides corresponding visual output on the display panel 541 based on the touch event type. In FIG. 12, the touch panel 531 and the display panel 541 are used as two independent parts to implement input and output functions of the mobile phone. However, in some embodiments, the touch panel 531 and the display panel 541 are integrated to implement the input and output functions of the mobile phone.

The mobile phone may further include at least one type of sensor 550, such as a light sensor, a motion sensor, and another sensor. The optical sensor may include an ambient light sensor and a proximity sensor. The ambient light sensor may adjust brightness of the display panel 541 according to brightness of ambient light, and the proximity sensor may turn off the display panel 541 or backlight when the mobile phone moves to an ear. As a type of motion sensor, an accelerometer sensor may detect magnitudes of acceleration in one or more directions (generally on three axes), detect a value and a direction of gravity at rest, and is used in an application for identifying a mobile phone posture (such as screen switching between a landscape mode and a portrait mode, a related game, or magnetometer posture calibration), a function related to vibration identification (such as a pedometer or a knock), and the like. For other sensors, such as a gyroscope, a barometer, a hygrometer, a thermometer, and an infrared sensor, that are further configured on the mobile phone, details are not described herein.

The audio circuit 560, a speaker 561, and a microphone 562 may provide an audio interface between the user and the mobile phone. The audio circuit 560 may convert received audio data into an electrical signal and then transmit the electrical signal to the speaker 561, and the speaker 561 converts the electrical signal into a sound signal for output. In addition, the microphone 562 converts a collected sound signal into an electrical signal. The audio circuit 560 receives the electrical signal, converts the electrical signal into audio data, and then outputs the audio data to the processor 580 for processing, to send, through the RF circuit 510, processed audio data to, for example, another mobile phone, or outputs the audio data to the memory 520 for further processing.

Wi-Fi is a short-distance wireless transmission technology. With the Wi-Fi module 570, the mobile phone may help the user send and receive an email message, browse a web page, gain access to streaming media, and the like. The Wi-Fi module 570 provides wireless access to a broadband internet for the user. Although FIG. 12 shows the Wi-Fi module 570, other embodiments do not include the Wi-Fi module 570 of the mobile phone.

The processor 580 is a control center of the mobile phone. The processor 580 connects components of the mobile phone through various interfaces and lines. In addition, the processor 580 runs or executes the software program or the module that are/is stored in the memory 520 and invokes data stored in the memory 520 to perform various functions of the mobile phone and data processing, so as to perform overall monitoring on the mobile phone. Optionally, the processor 580 includes one or more processing units. In at least one embodiment, an application processor and a modem processor are integrated into the processor 580. The application processor processes an operating system, a user interface, an application program, and the like, and the modem processor processes wireless communication. The foregoing modem processor is not integrated into the processor 580.

The mobile phone further includes the power supply 590 (such as a battery) for supplying power to the components. The power supply is logically connected to the processor 580 by using a power management system, thereby implementing functions such as charging, discharging and power consumption management by using the power management system.

Although not shown, the mobile phone may further include a camera, a Bluetooth module, and the like, and details are not described herein.

In embodiments of this application, the processor 580 included in the terminal device may perform functions in embodiments shown in FIG. 8 and FIG. 9. Details are not described herein again.

All or some of the foregoing embodiments are implemented by using software, hardware, firmware, or any combination thereof. When software is used to implement embodiments, all or some of embodiments are implemented in a form of a computer program product.

The computer program product includes one or more computer instructions. When the computer instructions are loaded and executed on a computer, all or some of the procedures or functions according to embodiments of the present disclosure are generated. The computer is a general-purpose computer, a dedicated computer, a computer network, or another programmable apparatus. The computer instructions are stored in a computer-readable storage medium or are transmitted from a computer-readable storage medium to another computer-readable storage medium. For example, the computer instructions are transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium accessible by a computer, or a data storage device, such as a server or a data center, integrating one or more usable media. The usable medium is a magnetic medium (for example, a floppy disk, a hard disk, or a magnetic tape), an optical medium (for example, a DVD), a semiconductor medium (for example, a solid-state drive (SSD)), or the like.

Persons skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, the disclosed systems, apparatuses, and methods are implemented in other manners. For example, the described apparatus embodiments are merely examples. For example, division into units is merely logical function division and the same or other divisions are used in actual implementation. For example, a plurality of units or components are combined or integrated into another system, or some features are ignored or not performed. In addition, the displayed or discussed mutual couplings or direct couplings or communication connections are implemented by using some interfaces. The indirect couplings or communication connections between the apparatuses or units are implemented in electronic, mechanical, or other forms.

The units described as separate parts may or may not be physically separate, and parts displayed as units may or may not be physical units, in other words, are located in one position, or are distributed on a plurality of network units. Some or all of the units are selected to achieve the objectives of the solutions in embodiments.

In addition, functional units in embodiments of this application are integrated into one processing unit, or the units may exist alone physically, or two or more units are integrated into one unit. The integrated unit is implemented in a form of hardware, or is implemented in a form of a software functional unit.

When the integrated unit is implemented in the form of a software functional unit and sold or used as an independent product, the integrated unit is stored in a computer-readable storage medium. Based on such an understanding, the technical solutions, or the part contributing to a conventional technology, or all or some of the technical solutions are implemented in a form of a software product. The software product is stored in a storage medium and includes several instructions for enabling a computer device (which is a personal computer, a server, a network device, or the like) to perform all or some of the operations of the methods described in embodiments of this application. The foregoing storage medium includes: any medium that stores program code, for example, a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art is able to make modifications to the technical solutions described in the foregoing embodiments or to make equivalent replacements to some technical features thereof, without departing from the scope of the technical solutions of the embodiments described herein.

What is claimed is:

1. An angle positioning method, comprising:
   receiving, by a terminal device, configuration information from a network device, wherein the configuration information includes reference signal configuration information and information about an association between N sets of frequency information and M sets of beam information, N is an integer greater than 1, and M is an integer greater than 1;
   receiving, by the terminal device, a reference signal corresponding to the reference signal configuration information;
   obtaining, by the terminal device, a measurement result, wherein the measurement result is obtained by measuring the reference signal based on an association relationship between frequency information and beam information; and
   reporting, by the terminal device, the measurement result to the network device.

2. The method according to claim 1, wherein the obtaining, by the terminal device, the measurement result includes:
   obtaining, by the terminal device, a reference signal received power; and
   obtaining, by the terminal device, the measurement result, wherein the measurement result includes angle information, the angle information is related to the received power and the information about the association between the N sets of frequency information and the M sets of beam information.

3. The method according to claim 1, wherein N is equal to M.

4. The method according to claim 1, wherein the frequency information is indicated by using an absolute radio frequency channel number.

5. The method according to claim 1, wherein the frequency information indicates a frequency range, or the frequency information indicates a center frequency within the frequency range.

6. The method according to claim 1, wherein the beam information includes one or more of the following information:
   a main lobe width, a main lobe direction, a beam gain in one or more directions, a beam side lobe width, or a side lobe direction.

7. The method according to claim 1, wherein the measurement result further includes measurement frequency information or a beam information index.

8. A terminal device, comprising:
   a transceiver;
   at least one processor; and
   one or more memories coupled to the at least one processor and storing programming instructions for execution by the at least one processor to cause the processor to:
   receive configuration information from a network device, wherein the configuration information includes reference signal configuration information and information about an association between N sets of frequency information and M sets of beam information, N is an integer greater than 1, and M is an integer greater than 1, wherein
   receive a reference signal corresponding to the reference signal configuration information;
   obtain a measurement result, wherein the measurement result is obtained by measuring the reference signal based on an association relationship between frequency information and beam information; and
   report the measurement result to the network device.

9. The terminal device according to claim 8, wherein the programming instructions further cause the processor to obtain a reference signal received power; and
   obtain the measurement result, wherein the measurement result includes angle information, the angle information is related to the received power and the information about the association between the N sets of frequency information and the M sets of beam information.

10. The terminal device according to claim 8, wherein N is equal to M.

11. The terminal device according to claim 8, wherein the frequency information is indicated by using an absolute radio frequency channel number.

12. The terminal device according to claim 8, wherein the frequency information indicates a frequency range, or the frequency information indicates a center frequency within the frequency range.

13. The terminal device according to claim 8, wherein the beam information includes one or more of the following information:
  a main lobe width, a main lobe direction, a beam gain in one or more directions, a beam side lobe width, or a side lobe direction.

14. The terminal device according to claim 8, wherein the measurement result further includes measurement frequency information or a beam information index.

15. A computer-readable storage medium, comprising instructions, wherein the instructions are run on a computer, the computer is enabled to perform following operations:
  receiving, by a terminal device, configuration information from a network device, wherein the configuration information includes reference signal configuration information and information about an association between N sets of frequency information and M sets of beam information, N is an integer greater than 1, and M is an integer greater than 1;
  receiving, by the terminal device, a reference signal corresponding to the reference signal configuration information;
  obtaining, by the terminal device, a measurement result, wherein the measurement result is obtained by measuring the reference signal based on an association relationship between frequency information and beam information; and
  reporting, by the terminal device, the measurement result to the network device.

16. The computer-readable storage medium according to claim 15, wherein the obtaining, by the terminal device, the measurement result includes:
  obtaining, by the terminal device, a reference signal received power; and
  obtaining, by the terminal device, the measurement result, wherein the measurement result includes angle information, the angle information is related to the received power and the information about the association between the N sets of frequency information and the M sets of beam information.

17. The computer-readable storage medium according to claim 15, wherein N is equal to M.

18. The computer-readable storage medium according to claim 15, wherein the frequency information is indicated by using an absolute radio frequency channel number.

19. The computer-readable storage medium according to claim 15, wherein the frequency information indicates a frequency range, or the frequency information indicates a center frequency within the frequency range.

20. The computer-readable storage medium according to claim 15, wherein the beam information includes one or more of the following information:
  a main lobe width, a main lobe direction, a beam gain in one or more directions, a beam side lobe width, or a side lobe direction.

\* \* \* \* \*